United States Patent
Awoniyi et al.

(10) Patent No.: US 9,031,530 B2
(45) Date of Patent: May 12, 2015

(54) SYSTEM AND METHOD FOR ASSISTING IN POWERING ON SLEEPING NETWORK ENTITIES

(75) Inventors: Olufunmilola O. Awoniyi, San Diego, CA (US); Andrea Garavaglia, Nuremberg (DE); Osok Song, San Diego, CA (US); Nathan Edward Tenny, Poway, CA (US); Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 13/286,139

(22) Filed: Oct. 31, 2011

(65) Prior Publication Data

US 2012/0142328 A1    Jun. 7, 2012

Related U.S. Application Data

(60) Provisional application No. 61/411,378, filed on Nov. 8, 2010.

(51) Int. Cl.
   *H04W 88/02* (2009.01)
   *H04W 52/02* (2009.01)
   (Continued)

(52) U.S. Cl.
   CPC ...... *H04W 52/0212* (2013.01); *H04W 52/0206* (2013.01); *H04W 24/02* (2013.01); *H04W 84/045* (2013.01); *H04W 36/22* (2013.01)

(58) Field of Classification Search
   USPC ........ 455/234.2, 550, 404.1, 418, 452.1, 524, 455/573; 370/328, 325, 230, 241, 338, 315, 370/326, 252, 310, 329, 331; 726/3; 709/228
   See application file for complete search history.

(56) References Cited

U.S. PATENT DOCUMENTS

2010/0169498 A1   7/2010   Palanki et al.
2011/0044284 A1   2/2011   Voltolina et al.
(Continued)

FOREIGN PATENT DOCUMENTS

EP   2056628 A1   5/2009
EP   2141947 A1   1/2010
(Continued)

OTHER PUBLICATIONS

3GPP TSG RAN WG3 Meeting #70, Qualcomm Incorporated, "Assisting Inter-RAT Nodes/eNBs in Turning on Sleeping Cells," R3-xxxxxx, Jacksonville, USA, Nov. 15-19, 2010, 3 pages.
3GPP TSG-RAN WG3 #69bis meeting, CMCC, "TP for Energy saving agreements," R3-103106, Oct. 11-15, 2010, Xi'an, China, 5 pages.

(Continued)

*Primary Examiner* — Diane Mizrahi
(74) *Attorney, Agent, or Firm* — Novak Druce Connolly Bove + Quigg LLP

(57) ABSTRACT

Techniques are provided to facilitate offloading of mobile entities from a serving network entity. For example, there is provided a location-based method that involves, in response to a load of the requesting entity exceeding a load threshold, identifying candidate network entities to which to offload a user equipment (UE), each of the candidate network entities being in sleep mode. The method may involve determining coverage and location information for the candidate network entities, and determining location information for the UE. The method may involve selecting a given network entity to turn ON based at least in part on the coverage information and the location information. The method may involve sending an ON-request message to the at least one selected network entity, the ON-request message including a timer that can be used to deactivate the selected network entity in case it is not useful in offloading the serving network entity.

9 Claims, 17 Drawing Sheets

(51) Int. Cl.
*H04W 36/22* (2009.01)
*H04W 24/02* (2009.01)
*H04W 84/04* (2009.01)

(56) References Cited

U.S. PATENT DOCUMENTS

| | | | |
|---|---|---|---|
| 2011/0170466 A1 | 7/2011 | Kwun | |
| 2011/0199905 A1 | 8/2011 | Pinheiro et al. | |
| 2011/0201279 A1 | 8/2011 | Suzuki et al. | |
| 2012/0110197 A1* | 5/2012 | Miklos et al. | 709/228 |

FOREIGN PATENT DOCUMENTS

| | | |
|---|---|---|
| JP | 2003075526 A | 3/2003 |
| JP | 2011091748 A | 5/2011 |
| JP | 2011130260 A | 6/2011 |
| JP | 2011135147 A | 7/2011 |
| JP | 2013516884 A | 5/2013 |
| WO | 2011083947 A2 | 7/2011 |

OTHER PUBLICATIONS

CMCC: "3rd Generation Partnership Project; Technical Specification Group Radio Access Networks; Evolved Universal Terrestrial Radio Access (E-UTRA); Potential solutions for energy saving for E-UTRAN (Release 10)", 3GPP TR 36.927 0.2.1; R3-103711, Nov. 19, 2010, pp. 01-18, XP002693890, Jacksonville, USA Retrieved from the Internet: URL: http://www.3gpp.org/ftp/tsg_ran/WG3_IU/TSGR3_70/Docs/ [retrieved on Mar. 14, 2013] Paragraphs 5.1.1 to 6.1.2.4.

Huawei: "Overview to LTE energy saving solutions to cell switch off/on", 3GPP Draft; R3-100162, 3rd Generation Partnership Project (3GPP), Mobile Competence Centre ; 650, Route Des Lucioles ; F-06921 Sophia-Antipolis Cedex ; France, vol. RAN WG3, no. Valencia, Spain; 20100118, Jan. 15, 2010, XP050424028, [retrieved on Jan. 15, 2010].

International Search Report and Written Opinion—PCT/US2011/061262—ISA/EPO—Mar. 27, 2013.

* cited by examiner

SYSTEM AND METHOD FOR ASSISTING IN POWERING ON SLEEPING NETWORK ENTITIES

CLAIM OF PRIORITY UNDER 35 U.S.C. §119

The present application for patent claims priority to Provisional Application No. 61/411,378, filed Nov. 8, 2010, entitled "SYSTEM AND METHOD FOR ASSISTING IN POWERING ON SLEEPING NETWORK ENTITIES", and is assigned to the assignee hereof, and is hereby expressly incorporated in its entirety by reference herein.

BACKGROUND

1. Field

The present application relates generally to wireless communications, and more specifically to systems and methods for assisting nodes in turning on sleeping network entities.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an evolved NodeB (eNB) and mobile entities (MEs), such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single-Carrier Frequency Division Multiple Access (SC-FDMA) on the uplink (UL). OFDMA allows data to be directed to or from multiple users on a subcarrier-by-subcarrier basis for a specified number of symbol periods.

Advanced cellular networks, such as LTE networks, may be being deployed for data-intensive applications to be performed by MEs. LTE networks, which include LTE cells that wirelessly communicate with the MEs, may consume a significant amount of power, which is wasteful if no ME is utilizing the fourth generation (4G) services provided by the LTE cells.

In a wireless communication network, ones of network entities (e.g., eNBs) controlling these LTE cells may be in an OFF or sleep state to conserve power, such as when these network entities are not needed to service the MEs. For example, eNBs in the OFF/sleep state may provide wireless service to the MEs, whereas eNBs that are powered down state may maintain communication capability between hotspot cells and the coverage cells without providing wireless service to the MEs. Transitioning to a powered OFF/sleep state therefore may not entail powering every component of the eNB hotspot cell entirely off, although mobile service components of the eNB hotspot cell may be generally powered OFF.

In some scenarios, the MEs that could be served by the network entities in the OFF or sleep could be supported by supported by neighboring cells. At times, networking entities controlling the neighboring cells may might detect a high load on a given eNB and attempt to offload one or more MEs that the given eNB is servicing to a network entity in the sleep state. In this context, there is a need to efficiently identify which sleeping eNBs to awake for the purpose of offloading one or more MEs from the given eNB to neighboring cells.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a location-based method that may be performed by a requesting network entity that is overloaded and needing to offload one or more mobile entities (e.g., user equipments (UEs)) to other network entities. The method may involve, in response to a load of the requesting entity exceeding a load threshold, identifying candidate network entities to which to offload at least one UE, each of the candidate network entities being in sleep mode. The method may further involve determining location and coverage information (e.g., locations, cell radii, and transmit powers) of the candidate network entities. In addition, method may involve determining the location information of at least one UE contributing to the load on the requesting network entity. The method may also involve selecting a given network entity of the candidate network entities to turn ON based at least in part on the coverage information and the location information. In related aspects, an electronic device (e.g., an evolved NodeB (eNB) or component(s) thereof) may be configured to execute the above-described methodology.

In accordance with one or more aspects of the embodiments described herein, a timer-based method is provided for facilitating the offloading of one or more mobile entities (e.g. UEs) from a serving network entity, wherein the method may be performed by a given network entity, such as, for example, an eNB that is initially in an OFF or sleep mode. The method may involve, in response to receiving an ON-request message with a timer from a requesting entity, entering into an ON-mode. The method may further involve sending an ON-response message to the requesting entity and an ON-notification message to at least one neighboring entity. The method may also involve, if the timer expires without a defined condition being met (e.g., the at least one UE sending an access channel transmission to the given network entity), (a) entering into sleep-mode and (b) sending an OFF-notification to the requesting entity and the at least one neighboring entity. In related aspects, an electronic device (e.g., an eNB or component(s) thereof) may be configured to execute the above-described methodology.

In accordance with one or more aspects of the embodiments described herein, there is provided a combination method that may be performed by a requesting entity that is overloaded and needing to offload one or more UEs. The method may involve, in response to a load of the requesting entity exceeding a load threshold, identifying network entities to which to offload at least one UE, each of the network entities being in sleep mode. The method may further involve determining coverage and location information for the network entities, as well as location information for the at least one UE. The method may yet further involve selecting at least one of the network entities to turn on based at least in part on the coverage information and the location information. The method may also involve sending an ON-request message to the at least one selected network entity, the ON-request message including a timer setting a time limit within which the at least one selected network entity remains in an ON-state. In related aspects, an electronic device (e.g., an eNB or component(s) thereof) may be configured to execute the above-described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 9 is a call flow diagram for an embodiment of a wireless network having a location-based enhancement for selecting which network entities to turn ON.

DESCRIPTION

Figure 1:
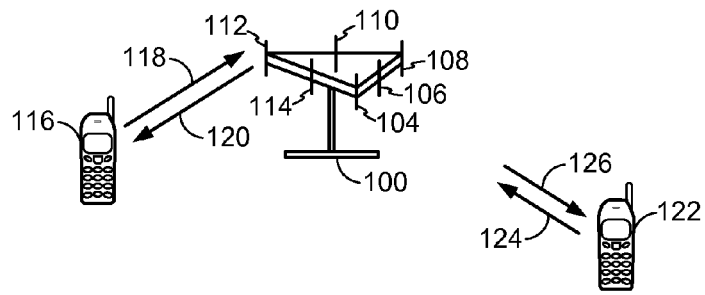
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. In the following description, for reasons of conciseness and clarity, terminology associated with W-CDMA and LTE standards, as promulgated under the 3GPP standards by the International Telecommunication Union (ITU), is used. It should be emphasized that the techniques described herein are applicable to other technologies, such as the technologies and standards mentioned above.

Single-Carrier Frequency Division Multiple Access (SC-FDMA), which utilizes single carrier modulation and frequency domain equalization, is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional including 112 and 114. In FIG. 1, two antennas are shown for each antenna group; however, more or fewer antennas may be utilized for each antenna group. A mobile entity (ME) 116 is in communication with the antennas 112 and 114, where the antennas 112 and 114 transmit information to the ME 116 over a forward link 120 and receive information from the ME 116 over a reverse link 118. An ME 122 is in communication with the antennas 106 and 108, where the antennas 106 and 108 transmit information to the ME 122 over a forward link 126 and receive information from the ME 122 over a reverse link 124. In a Frequency Division Duplex (FDD) system, the communication links 118, 120, 124 and 126 may use different frequency for communication. For example, the forward link 120 may use a different frequency than that used by the reverse link 118.

Each group of antennas and/or the area in which they are designed to communicate is often referred to as a sector of the access point. In the embodiment, antenna groups each are designed to communicate to MEs in a sector, of the areas covered by the access point 100.

In communication over the forward links 120 and 126, the transmitting antennas of the access point 100 may utilize beamforming in order to improve the signal-to-noise ratio of forward links for the different MEs 116 and 124. Also, an access point using beamforming to transmit to MEs scattered randomly through its coverage causes less interference to MEs in neighboring cells than an access point transmitting through a single antenna to all its MEs.

An access point may be a fixed station used for communicating with the terminals and may also be referred to as an access point, a NodeB, an eNB, or some other terminology. A ME may also be referred to as an access terminal (AT), a user equipment (UE), a mobile station, a wireless communication device, terminal, or the like.

Figure 2:
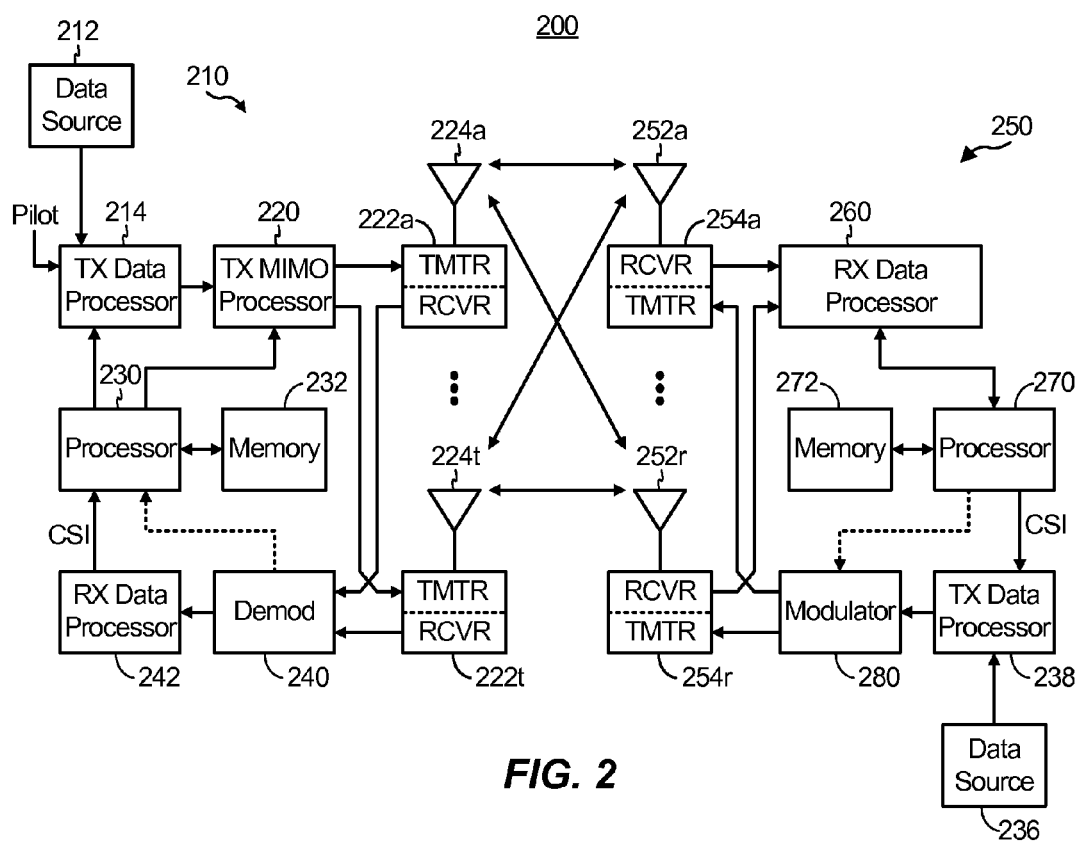
FIG. 2 illustrates a block diagram of a communication system.

FIG. 2 is a block diagram of an embodiment of a transmitter system 210 (also known as an access point) and a receiver system 250 (also known as a ME) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use, discussed further below. The processor 270 formulates a reverse link message comprising a matrix index portion and a rank value portion, and may be in operative communication with a memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
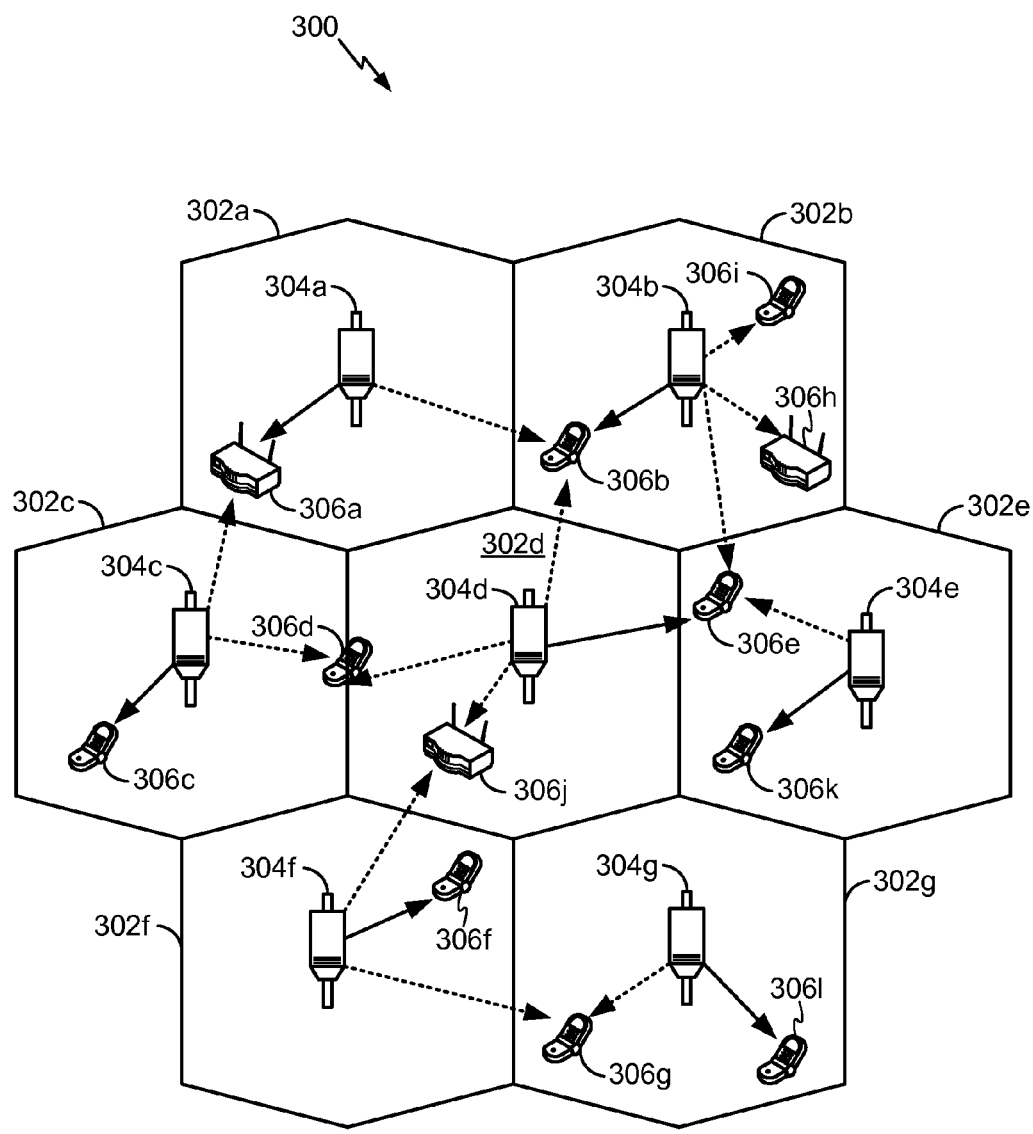
FIG. 3 illustrates a wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302a-302g, with each cell being serviced by a corresponding access node 304 (e.g., access nodes 304a-304g). As shown in FIG. 3, MEs 306 (e.g., MEs 306a-306l) may be dispersed at various locations throughout the system over time. Each ME 306 may communicate with one or more access nodes 304 on a forward link ("FL") and/or a reverse link ("RL) at a given moment, depending upon whether the ME 306 is active and whether it is in soft handoff (if applicable), for example. The wireless communication system 300 may provide service over a large geographic region. For example, macro cells 302a-302g may cover a few blocks in an urban or suburban neighborhood or a few square miles in a rural environment.

Figure 4:
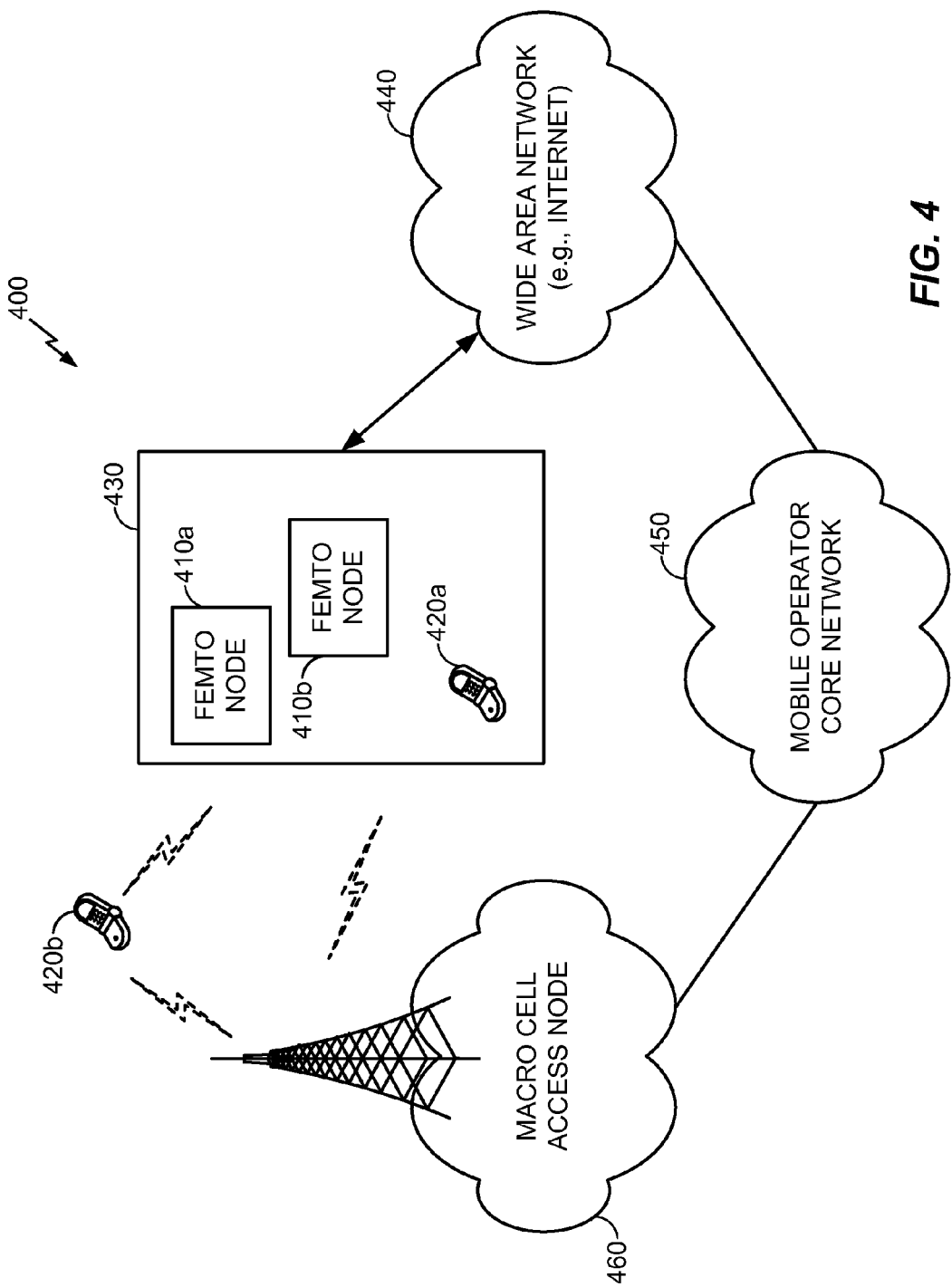
FIG. 4 illustrates an exemplary communication system to enable deployment of femto nodes within a network environment.

FIG. 4 illustrates an exemplary communication system 400 where one or more femto nodes are deployed within a network environment. Specifically, the system 400 includes multiple femto nodes 410 (e.g., femto nodes 410a and 410b) installed in a relatively small scale network environment (e.g., in one or more user residences 430). Each femto node 410 may be coupled to a wide area network 440 (e.g., the Internet) and a mobile operator core network 450 via a DSL router, a cable modem, a wireless link, or other connectivity means (not shown). Each femto node 410 may be configured to serve an associated ME 420a and, optionally, an alien ME 420b. In other words, access to femto node(s) 410 may be restricted whereby a given ME 420 may be served by a set of designated (e.g., home) femto nodes but may not be served by any non-designated femto nodes (e.g., a neighbor's femto node).

Figure 5:
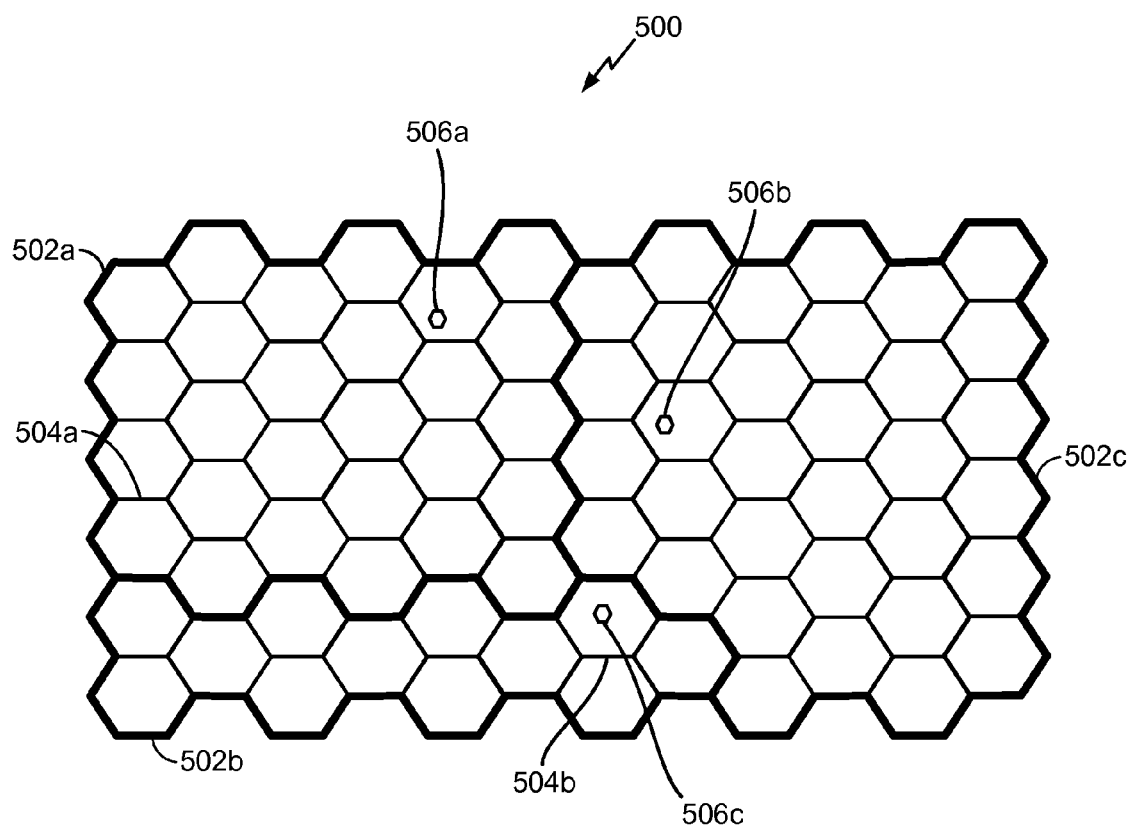
FIG. 5 illustrates an example of a coverage map with several tracking areas defined.

FIG. 5 illustrates an example of a coverage map 500 where several tracking areas 502 (or routing areas or location areas) are defined, each of which includes several macro coverage areas 504. Here, areas of coverage associated with tracking areas 502a, 502b, and 502c are delineated by the wide lines and the macro coverage areas 504 are represented by the hexagons. The tracking areas 502 also include femto coverage areas 506. In this example, each of the femto coverage areas 506 (e.g., femto coverage area 506c) is depicted within the macro coverage area 504 (e.g., macro coverage area 504b). It should be appreciated, however, that a femto coverage area 506 may not lie entirely within a macro coverage area 504. In practice, a large number of femto coverage areas 506 may be defined with a given tracking area 502 or macro coverage area 504. Also, one or more pico coverage areas (not shown) may be defined within a given tracking area 502 or macro coverage area 504.

Embodiments described herein present techniques for Inter-Radio Access Technology (RAT) energy saving mechanisms. It is again noted that, while terminology associated with LTE standards, as promulgated under the 3GPP standards, is used herein, the techniques described herein are applicable to other technologies and standards.

Figure 6:
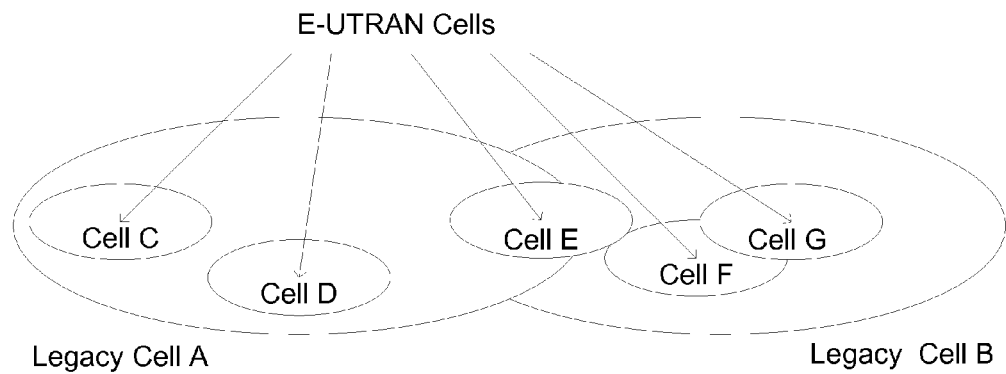
FIG. 6 illustrates one embodiment of an Inter-RAT energy saving scenario.

With reference to FIG. 6, there is shown an exemplary Inter-RAT energy saving scenario, referred to herein as an Inter-RAT scenario, and also described in document R3-103106 ("TP for Energy saving agreements") of the 3GPP TSG-RAN WG3 #69bis meeting. In the Inter-RAT scenario, Evolved Universal Terrestrial Radio Access Network (E-UTRAN) Cell C, D and other E-UTRAN cells are covered by the same legacy RAT Cells A and B (e.g., UMTS or GSM). Cell AB has been deployed to provide basic coverage of the services in the area, while other E-UTRAN cells boost the capacity. If the cells shown in FIG. 6 have the multiple public land mobile networks (PLMNs), network sharing scenario may occur without issues. With respect to Radio Access Network (RAN) sharing, in one embodiment, the coverage and hotspot cells may be owned by the same operator. In another embodiment, the coverage and hotspot cells may be owned by different operators. In yet another embodiment, the coverage cells may be owned by different operators.

The Inter-RAT scenario relates to a deployment of E-UTRAN cells for capacity enhancement at some hot spots, therefore, the continuity of LTE coverage can not be guaranteed. The legacy network provides the basic coverage for those UEs with multi-mode capability and the E-UTRAN-only UEs can not be served when they are out of the coverage of E-UTRAN. The solutions for the Inter-RAT scenario should be considered in cases where there are no LTE-only capable devices.

With respect to solutions for cell switch ON/OFF, there is provided a signaling-exchange solution that involves cell switch ON/OFF based on signaling across RATs. With this signaling-exchange solution, the capacity boosting E-UTRAN cell may be switched OFF autonomously based on information available in the cell. Switch-on may be performed upon request by one or more neighbor Inter-RAT nodes. Intra-RAT and Inter-RAT neighbor nodes should be informed after ON/OFF decision is made. After that, if some E-UTRAN cells find that it could return to sleep mode, they can switch themselves OFF again.

However, when the E-UTRAN cells are not active and the load on the coverage cell increases, the coverage cells may not know which cell should be waken up, especially when the increasing load is in one or few hotspots. Based on above issue described, the signaling-exchange solution may be enhanced to better select the appropriate candidates to activate. Specifically, with another solution (referred to herein as the radio frequency (RF)-measurement solution), the listening capability of the E-UTRAN cells may be enabled independently from other functions of the cell. In that case, the sleeping cells may monitor, when requested, interference over thermal (IoT) ratio, which is obtained based on received interference power and thermal noise power. Then, when a legacy cell providing coverage detects high load, it may request the E-UTRAN cells within its coverage to provide IoT measurements, and then using its proprietary algorithm, in most cases it will be able to find which E-UTRAN cells are the most appropriate to serve the higher load. Therefore, those legacy UTRAN/GERAN cells could activate the appropriate E-UTRAN cells while keeping other hotspot cells in sleep mode.

Figure 7:
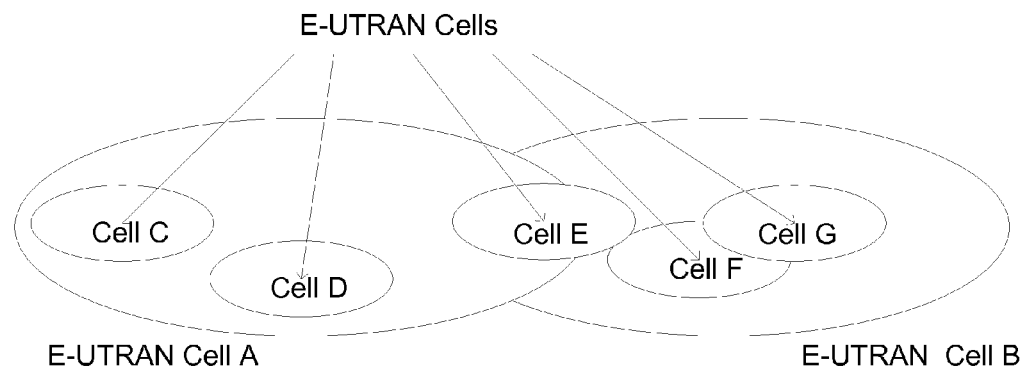
FIG. 7 illustrates one embodiment of an Inter-eNB energy saving scenario.

Embodiments described herein present techniques for Inter-eNB energy saving mechanisms. With reference to FIG. 7, there is shown an exemplary Inter-eNB energy saving scenario, referred to herein as an Inter-eNB scenario. In the Inter-eNB scenario, E-UTRAN Cell C, D and other E-UTRAN cells are totally covered by the E-UTRAN Cell A and B. Here, Cells A and B have been deployed to provide basic coverage, while other E-UTRAN cells boost the capacity. When some cells providing additional capacity are no longer needed, they could be switched OFF for energy optimization. In this case, both the continuity of LTE coverage and service quality of service (QoS) could be guaranteed.

With the signaling-exchange solution (cell switch ON/OFF based on signaling exchanging), the capacity boosting E-UTRAN cell may be switched off autonomously based on information available in the cell (e.g., load information) to lower energy consumption. Switch-on may be performed upon request by one or more neighbor E-UTRAN nodes if capacity needs in such cells demand doing so, and the eNB owning the dormant cell should normally obey a request. In this procedure, its neighbor nodes should be informed after ON/OFF decision is made. After that, if some activated cells find that they could return to sleep mode, they can switch themselves OFF again.

With the RF-measurement solution (enhancement of signaling-exchange solution to enable the cells to select the most appropriate candidates to activate), the listening capability of the capacity boosting cells may be enabled independently from other functions of the cell. Such cells may monitor, when requested, the IoT ratio. When a cell providing coverage detect high load, it may request the hotspot cells within its coverage to provide their IoT measurements, and then find out which capacity boosting cells are the most appropriate to serve the higher load. Therefore, those coverage E-UTRAN cells could activate the appropriate cells for offloading while keeping other E-UTRAN hotspot cells in sleep mode.

Embodiments described herein present techniques for assisting in powering ON sleeping network entities, such as, for example, eNBs or the like. For example, described herein are techniques by which a requesting node (e.g., Radio Network Controller (RNC) or eNB) selects which sleeping network entities (e.g. eNBs) to turn ON. The issue of which sleeping cells to wake-up arises in scenarios where a requesting Inter-RAT cell/node or eNB (e.g., a highly loaded node/cell) requests certain eNBs in the sleep (OFF) mode to wake-up in order to assist it (e.g., in offloading). In the signaling-exchange solution, discussed above, the requesting node sends "ON-request" messages to certain eNBs, some of which might not be able to assist the requesting node. Those eNBs can return to the sleep mode after a given period.

The amount of energy savings derived from the sleeping eNBs can be improved and unnecessary signaling can be avoided if the requesting node sends "ON-requests" only to eNBs that can indeed assist it. An enhancement to the signaling-exchange solution targeting some of these improvements was the RF-measurement solution, described above. The RF-measurement solution involves using RF measurements, such as, for example, IoT measurements taken by the sleeping eNBs to select sleeping cell(s) that can assist the requesting node. In certain scenarios, the RF-measurement solution might be adequate in selecting eNBs that can assist a requesting node. However, in other scenarios, there are a number of potential issues that could make the RF-measurement solution power inefficient, infeasible and unreliable. These issues may include:

1. Power Consumption in eNB: The eNBs are in sleep mode where at least some RF components of such cells are powered OFF. Therefore, when they are requested to report IoT measurements, their uplink receivers need to be activated to take measurements. This reduces the energy savings on the eNBs.

2. Inter-RAT interference measurements: In case the node requesting IoT measurements is an RNC, the eNBs require receivers that have the capability of measuring interference in the UTRAN bands. Since such capability is not mandatory in eNBs, there is no guarantee that the eNBs will be equipped with such receivers.

3. Reliability of IoT measurements: IoT measurements which are similar to the Rise over Thermal (RoT) measurements in UMTS are in general difficult to obtain reliably due to the inability of uplink receivers to accurately mimic a power meter. The variability in the thermal noise measurements of the uplink receiver, the receiver's sensitivity to temperature, variability in the UEs transmit powers, path gains, mobility and number of UEs contributing to the uplink interference, could cause significant variations and errors in IoT measurements. In addition, it is difficult to correlate interference from specific UEs to the IoT measurements. This is particularly important in scenarios where the eNB measuring the IoT is located at the edge of the requesting node, UEs supported by neighboring Inter-RAT nodes or eNBs might be contributing to the IoT measurements and not only UEs on the requesting node.

4. Reliability of RSRP measurements: The RSRP measurements are highly dependent on UE mobility and channel conditions between the eNBs and UEs. Since the RSRP measurements were obtained by the UEs before the eNBs entered the sleep mode while the IoT measurements were taken while the eNBs are in sleep mode, it possible that both measurements were taken under significantly different conditions, hence, their combination could result in erroneous estimations.

Inter-RAT Scenarios: In related aspects, apart from IoT measurements, there are provided solutions that involve making different types of measurements. For example, an OAM predefined "low-load periods" solution/policy may be implemented, wherein in response to the coverage UTRAN/GERAN cell detecting high load (e.g., a load value meeting or exceeding a defined load threshold value), the UTRAN/GERAN cell may use an algorithm to decide which E-UTRAN cells should be activated. The algorithm could rely on predefined low-load periods policies for each neighbor E-UTRAN cell. The low-load periods information may be derived from OAM based performance counters or the like, and the decision may then be implemented in the coverage cell. It is noted, however, that the low-loads periods solution has limited flexibility in that it involves estimating traffic/load at a given time and applying the estimated traffic at other times, despite the fact that the traffic levels may have changed at the other times. In contrast, the location-based solution, described below, adapts to changes in traffic.

In further related aspects, there is provided a UE-measurement solution that involves implementing UEs measurements. For example, in response to the coverage UTRAN/GERAN cell detecting high load, it may request one or more dormant E-UTRAN cells to transmit the pilot signal (e.g., reference signal in LTE) for at least a short time interval (i.e. probing interval). After the probing interval, all or some E-UTRAN cells may return to dormant mode. The UEs covered by the coverage UTRAN/GERAN cell may be configured to perform Reference Signal (RS) measurements from the E-UTRAN cells during this interval and send feedback. Based on the measurement results, the coverage UTRAN/GERAN cell may determine which E-UTRAN cells should be switched ON. It is noted however, that the UE-measurement solution cuts into energy savings of eNBs or the like, whereas the location-based solution, described below, does not involve waking-up sleeping eNBs or the like, unless there is a realistic possibility that these sleeping eNBs or the like can help with offloading. As such, the location-based solution conserves more energy during process of selecting which sleeping eNBs to turn ON.

In accordance with one or more aspects of the embodiments described herein, there is provided a location-based solution that involves implementing positioning information for UEs and/or cells. For example, in response to the coverage UTRAN/GERAN cell detecting high load, it may use a combination of UEs' locations, cell locations, and cell radii/transmit powers in deciding which E-UTRAN cells should be switched ON (e.g., cells that cover the UEs). A timer value may be included in the activation request message sent from the coverage cell to the selected E-UTRAN cells. At the expiration of such a timer, each E-UTRAN cell may verify if the condition required for staying ON has been met; if not, the E-UTRAN cell may autonomously switch OFF again. As explained above, the location-based solution provides advantages over other solutions for determining which eNBs or the like to turn ON, such as, for example, the UE-measurement solution, the low-loads periods solution, the RF-measurement solution, the signaling-exchange solution, etc.

Inter-eNB Scenarios: Analogous to Inter-RAT Scenarios described immediately above, IoT and other types of measurements may be used to determine which, if any, hotspot cells should be turned ON. In related aspects, an OAM predefined "low-load periods" policy may be implemented, wherein in response the coverage cell detecting high load, the coverage cell may use an algorithm to decide which hotspot cells should be activated. The algorithm could rely on predefined low-load periods policies for each neighbor hotspot cell. The low-load periods information may first be derived from OAM based performance counters, and then configured in the coverage cell, the decision may then implemented in the coverage cell.

In further related aspects, there is provided a solution that involves implementing UEs measurements. For example, in response to the coverage cell detecting high load, it may request one or more dormant hotspot cells to transmit the pilot signal (e.g., reference signal in LTE) for at least a short time interval (i.e. probing interval). After the probing interval, all or some hotspot cells may return to dormant mode. The UEs covered by the coverage cell will be configured to perform Reference Signal (RS) measurements from the hotspot cells during this interval and send feedback. Based on the measurement results, the coverage cell may determine which hotspot cells should be switched ON.

In yet further related aspects, there is provided a location-based solution that involves implementing positioning information for UEs and/or cells. For example, in response to the coverage cell detecting high load, it may use a combination of UEs' locations, cell locations, and cell radii/transmit powers in deciding which hotspot cells should be switched ON (e.g., cells that cover the UEs). A timer value may be included in the activation request message sent from the coverage cell to the selected hotspot cells. At the expiration of such a timer, each hotspot cell may verify if the condition required for staying ON has been met; if not, the hotspot cell may autonomously switch OFF again. As noted previously, the location-based solution provides advantages over other approaches to determining which eNBs or the like to turn ON.

Location-Based Enhancement: To address the issues associated with the RF-measurement solution, UE locations, eNB locations and cell radii or transmit powers can be used in selecting eNBs that can assist a requesting node/entity. In contrast to the RF-measurement solution, the eNBs do not have to be turned ON to make RF measurements while they are in sleep mode so the energy savings on the cells are preserved. In addition, reliable eNB and UE location can be obtained using several positioning methods. Furthermore, eNBs do not require additional receivers for making IoT measurements on Inter-RAT cells. Hence, in one embodiment, the requesting node may use UE locations, eNB locations, and cell radii/transmit powers in selecting which cells to be turned ON or activate. A requesting RNC/eNB can request the hotspot eNB's location can be requested from a Location Service (LCS) entity in the network or the location can be configured by the O&M at the requesting node. Furthermore, the transmit powers of the eNBs can be configured by the O&M and then the requesting node may calculate the cell radii or the cell radii can be configured directly by O&M. The requesting node can also select certain UEs and request their locations from the LCS entity. For determining the UE location, the LCS entity can use positioning methods such as the observed time difference of arrival (OTDOA), CELL-ID, Enhanced-CELL ID, Assisted Global Navigation Satellite System (AGNSS), etc.

For example, the requesting node (e.g., RNC or eNB) may collect information about the eNBs' locations and cell radii/transmit powers. Since the eNBs' locations are static, constant updates are not required. The requesting node may select certain UEs to poll for location information. The UEs requesting significant network resources on the coverage cells (e.g. the UEs with the highest data rate) can be selected to be polled for location information. Based on the UEs' locations, eNBs' locations and coverage of the eNBs, the requesting node may select which cells to turn ON.

Figure 9:
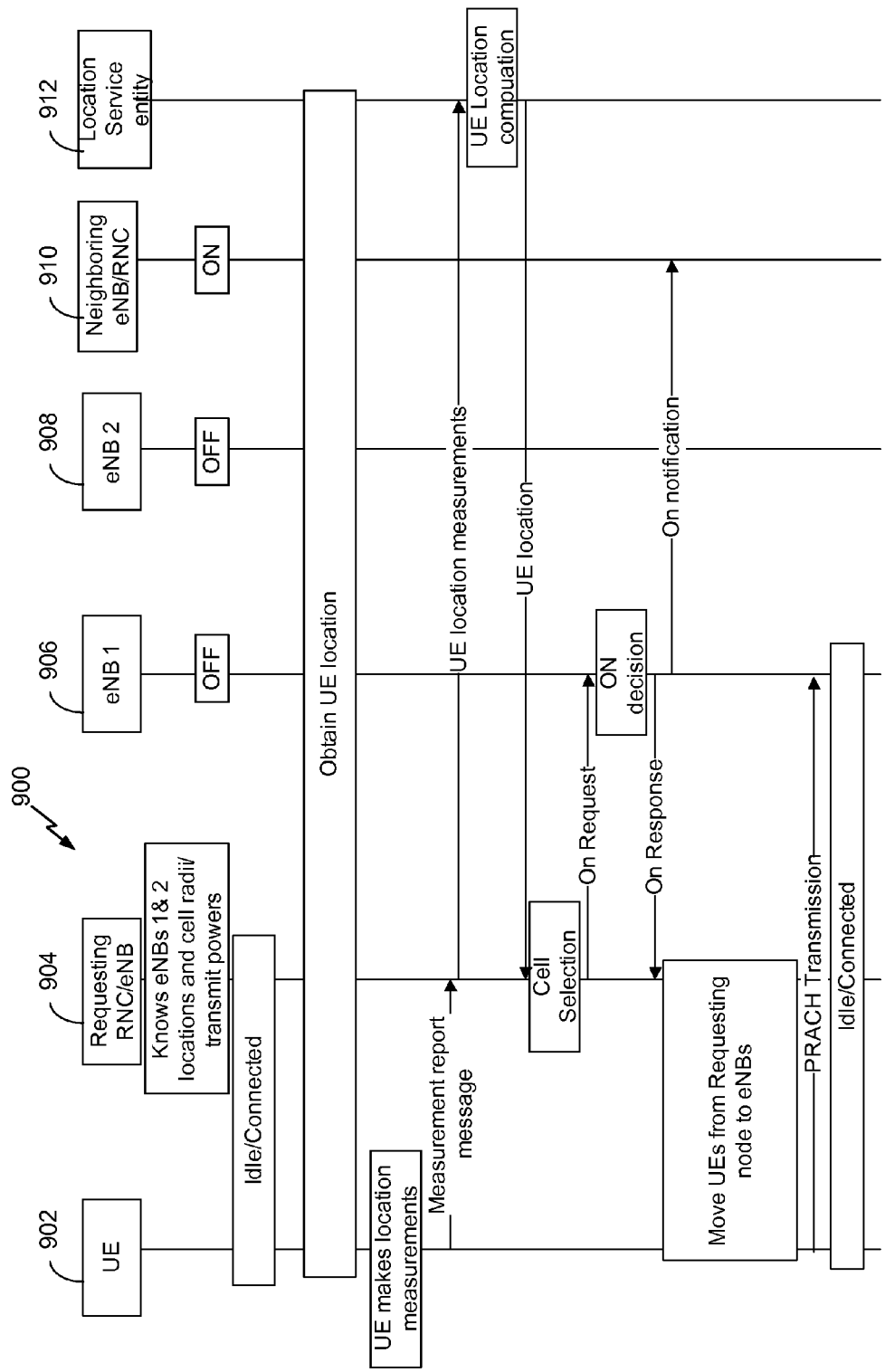

An exemplary call flow of how location information can used in selecting the appropriate eNB is presented in FIG. 9. With reference to FIG. 9, there is shown a wireless communication system 900 that includes UE(s) 902 in the idle or connected state being served by a requesting node/entity 904 (e.g., an RNC or an eNB), which in turn may be operative communication with a network entity 906 (e.g., eNB-1) in the OFF state, a network entity 908 (e.g., eNB-2) in the OFF state, a neighboring network entity 910 (e.g., an eNB or an RNC) in the ON state, and/or an LCS entity 912 or the like. Only one UE 902 is illustrated; however, the system 900 may include a plurality of UEs 902.

In this example, the requesting node 904 wants to determine if eNB-1 or eNB-2 (i.e., entities/nodes 906 or 908) can offer it assistance. In one embodiment, the requesting node 904 has already obtained eNB-1's and eNB-2's locations, cell radii or transmit powers using mechanisms discussed earlier. In order to obtain the UE 902's location, the requesting node 904 may request the UE location from the LCS entity 912. During this process, the LCS entity could request the UE(s) to make measurement to in determining the UE location. To assist the UE in making more accurate measurements, "assistance data" from the LCS entity 912 may be delivered to the selected UE(s). The requesting node 904 may collect the UE location measurements and forward them to the LCS entity 912 after which the LCS entity 912 computes the UE location and sends it to the requesting node 904 to be used in the eNB cell selection algorithm. In the example illustrated in FIG. 9, the eNB-1 906 is found to be suited in assisting the requesting node 904, hence, the "ON-request" is sent only to the eNB-1 906. Upon making an ON decision, the eNB-1 906 may send an ON-response to the node 904 and an ON-notification to the neighboring node 910. As a result, the UE 902 may be moved from the requesting node 904 to the eNB-1 906. The idle or connected mode UE 902 on the requesting node may send a PRACH transmission message to the eNB-1 906. It is noted that in order to reduce the signaling between the requesting node 904 and LCS entity 912 while requesting location information for multiple UEs 902, the requesting node 904 can cache the "assistance data" so as to eliminate multiple requests from the LCS entity 912. In addition, although the positioning method assumed in the example in FIG. 9 is UE-Assisted (that is the location information is computed in the LCS entity although the UE provided the measurements), UE-based positioning methods where the UE 902 takes the measurements and calculates the location before forwarding it to the requesting node 904 can also be used. The UE-based positioning methods would reduce the delay in deriving the locations and also reduce signaling between the eNB(s) and the LCS entity 912. With the location-based enhancement/technique, the requesting node may use UE locations, eNB locations, and cell radii and/or transmit powers in selecting which eNBs to turn ON.

In related aspects, the location-based enhancement may be referred as a location-based wake-up solution, wherein the requesting node (e.g., the node providing the cell coverage) may use pre-configured neighboring eNB locations and estimated locations of multiple connected mode UEs to determine which inactive eNB cells to power ON to assist it in offloading one or more of the UEs. FIG. 9, described above, shows an example of a call flow showing a general framework for the location-based cell wake-up solution for both inter-RAT (UTRAN-E-UTRAN) and inter-eNB (E-UTRAN-E-UTRAN) scenarios.

Specifically, in the inter-RAT scenario where the underlay network is a UTRAN, the UTRAN positioning architecture may enable the RNC to use an internal LCS client to request a UE's location from the SMLC. The SMLC is an entity in the UTRAN that coordinates the UE location acquisition process. Upon the reception of a UE location request, the SMLC may request measurements from the UE and/or NodeBs, may compute the location estimates, and may forwards the location estimate to the RNC. As alluded to above, UTRAN may support numerous UE positioning methods, such as, for example, the cell coverage method (also known as CELL_ID/Enhanced CELL_ID), OTDOA, Uplink OTDOA (U-TDOA), and the A-GNSS method. In related aspects, the CELL ID method may involve providing the cell information (Cell ID or service area or geographical coordinates) of the serving cell of the target UE. In order to determine more refined UE location within the cell, the E-CELL ID method may involve combining the CELL ID with measurements such as, for example, the received signal code power (RSCP) of the pilot channel (CPICH), the received energy per chip/power density in the band (Ec/No) of the CPICH, round trip time (RTT), path loss, etc. from the UE or NodeB. In addition, the angle of arrival (AoA) information may be used to determine the sector where the UE is located. Many of the above-described measurements are typically made by the UE and/or the serving NodeB, and thus may already be available at the serving NodeB such that the UEs may not be required to make additional measurements for location estimation. Furthermore, it is important to note that even if the UE makes measurements for location estimation, further processing and calculation of the location estimate may be performed in the network (as part of network-based/UE-assisted positioning method), thereby achieving limited UE battery drain and processing demands.

In further related aspects, the accuracy of the cell coverage method, which is typically in the range of hundreds of meters, may be sufficient for the cell wake up application. For improved accuracy of the eNB selection algorithm, multiple UE locations may be used by the RNC in the selection process, thereby achieving increased statistical confidence. Stated differently, cell wake-up selection accuracy may be increased by taking into account the locations of multiple UEs that are representative of the coverage cell.

Obtaining UE Location In Inter-RAT Scenarios: In order to obtain UE location information in the GERAN or UTRAN, there are two major entities involved in the process, the LCS client and the server. The LCS client is the entity in the cellular network tasked with requesting the UE's location from the network while the server coordinates the process of obtaining the location (e.g., taking measurements and calculating the location estimates) and responding back to the LCS client. The LCS server is typically embedded in the GERAN/UTRAN (otherwise known as the Serving Mobile Location Center (SMLC)). Unlike the LSC server, the LCS client may be embedded in the GERAN/UTRAN (e.g., in the MSC, SGSN and RNC), in the UE or in an entity external to the cellular network.

For the Inter-RAT scenario, for example, where an RNC desires to turn on powered off eNBs to assist with offloading, it may be most effective that the UE location request be sent from the RNC to the SMLC. This is currently supported in the UTRAN standards through the location of an LCS client in the RNC. In addition, the SMLC may also be collocated with the RNC in an RNC centric positioning architecture; this architecture reduces the delay and signaling associated with the UE positioning procedure. It is important to note that apart from the RNC centric architecture, the standard also supports the standalone SMLC (SAS) centric architecture where the SMLC is a separate entity in the RAN network from the RNC.

Figure 16:
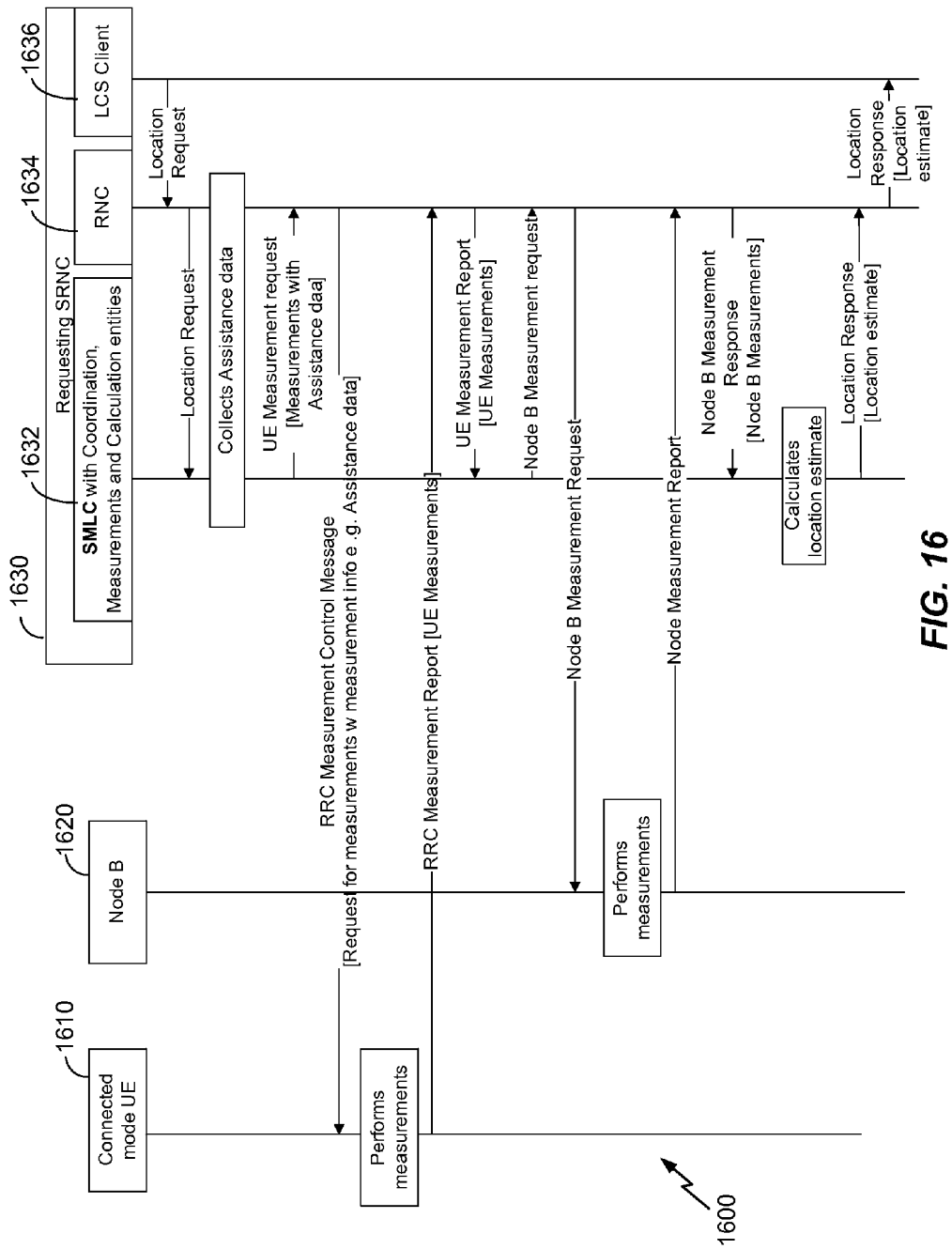
FIG. 16 is a call flow diagram for an embodiment of a system for obtaining UE location in an RNC centric mode.

With reference to FIG. 16, there is provided a call flow diagram showing, for one embodiment of a system 1600, the RNC 1634 obtaining the location of a UE 1610 in an RNC centric mode. The Serving RNC (SRNC) 1630 in the FIG. 16 includes three modules—the SMLC 1632, LCS client 1636, and the RNC 1634 which is the module performing the regular RNC functions. The LCS client module 1636 in the SRNC 1630 starts the UE 1610 positioning process by sending a location request to the SMLC 1632. Once the SMLC 1632 receives the location request and collects the necessary information for measurements from the UTRAN, UE 1610 or NodeB 1620 measurements are triggered by the SMLC 1632 sending the UE/NodeB measurement request to the RNC module 1634. The RNC 1634 then uses RRC measurement control message to instruct the UE 1610 to take measurements. Similarly, the RNC 1634 also could instruct the serving NodeB 1620 to obtain measurements. The UE 1610 performs the requested measurement and sends them to the RNC 1634 using the RRC measurement report message; these measurements are then forwarded to the SMLC 1632. Measurements from NodeBs 1620 are also sent to the RNC 1634 and also forwarded to the SMLC 1632. With the measurements obtained from the NodeB 1620 and UE 1610, the SMLC 1632 calculates the location estimate using one or more of the positioning methods defined in the standard, such as, for example, the cell coverage-based (CELL ID/Enhanced CELL ID), the OTDOA, U-TDOA, or the A-GNSS. The location estimate alongside with its accuracy, if available, is then sent to the LCS client 1636 in the SRNC 1630.

It is noted that the type of measurements requested from the UE 1610 and

NodeB 1620 may be a function of the positioning method. For example, for the E-CELL-ID method, the UE 1610 can be requested to measure the serving cell's CPICH RSCP while for the A-GNSS method, the UE 1610 could be instructed to report the carrier to noise ratio from the satellites specified in the "assistance data" (the "assistance data" is information signaled from the network to the UE 1610 to assist the UE 1610 in taking measurements on satellites, such as, for example, the number and IDs of Satellites, their Doppler information and search window width, etc.). The assistance data gathering from the UTRAN may be coordinated by the SMLC 1632 and signaled to the UE 1610 with RRC signaling through the RNC 1634. Assistance data may also be used in the OTDOA positioning method.

Obtaining UE Location In Inter-eNB Scenarios: Similar to the discussions on the UTRAN UE positioning procedure presented above, the two major entities, the LCS client and server may also be required for UE positioning in the E-UTRAN in inter-eNB scenarios. In the E-UTRAN, the LCS server may be implemented as a standalone server known as the enhanced serving location center (E-SMLC). Unlike the E-SMLC, the LCS client can be located in the MME, in an entity external to E-UTRAN or in the UE. For the cell wake-up application of interest in the inter-eNB scenarios, the requesting node may be the eNB. As such, the most effective implementation in terms of signaling and delay may be when the eNB requests the UE location. For example, the LCS client may remain in the MME but S1-AP "location request" and "location response" messages may be defined to carry location request and responses between the eNB and MME.

Figure 17:
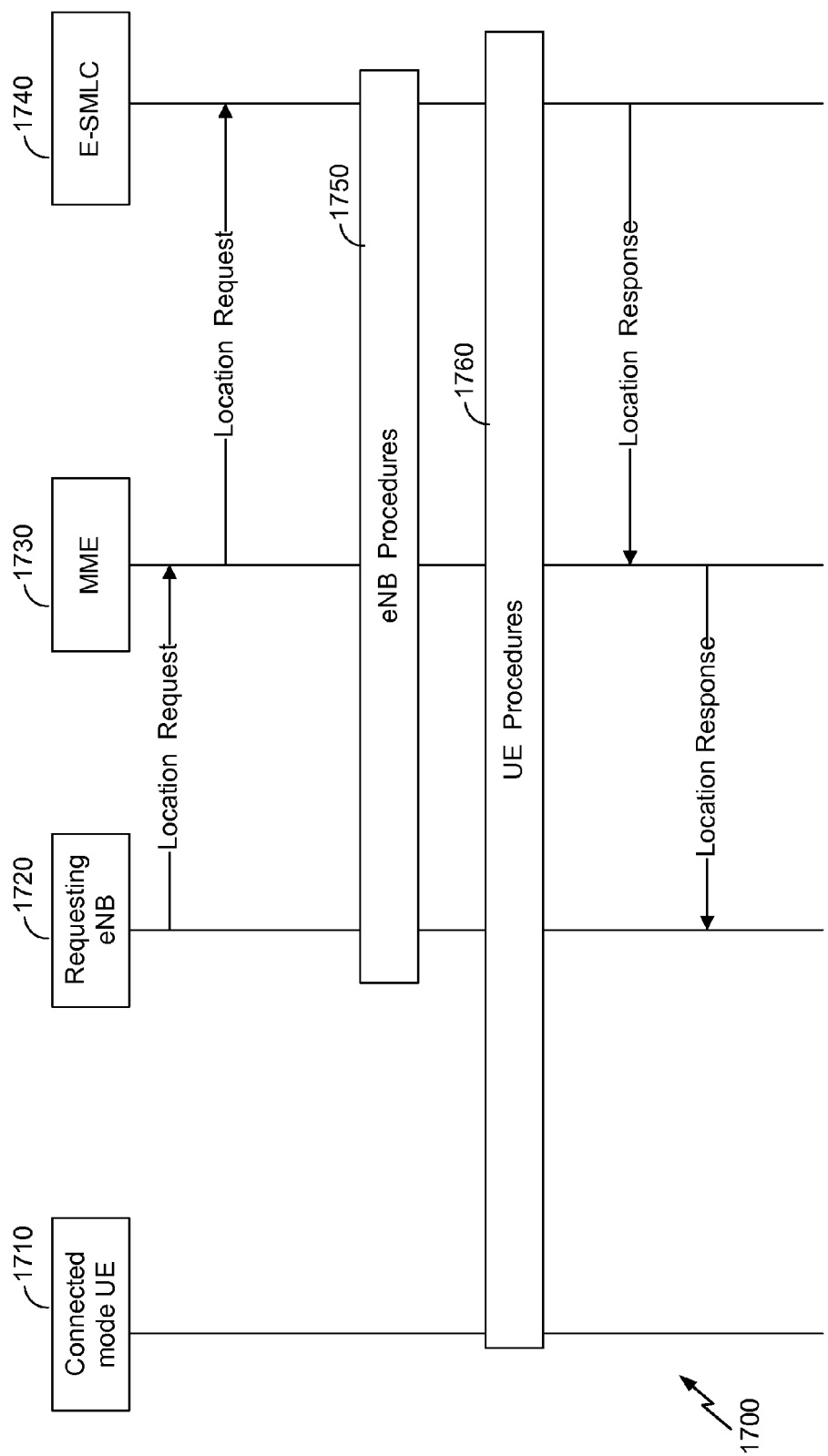
FIG. 17 is a call flow diagram for an embodiment of a system for requesting UE location from an E-UTRAN.

In related aspects, the eNB may request UE location from the E-UTRAN via the call flow shown in FIG. 17. As shown in FIG. 17, in one embodiment of a system 1700, once the MME 1730 receives the location request from the eNB 1720, the MME 1730 initiates the location positioning request for the UE 1710 from the E-SMLC 1740. After the reception of a location request for a target UE, the E-SMLC 1740 initiates the eNB procedures 1750 in order to gather assistance data from eNBs (e.g., for the downlink method otherwise, known as OTDOA) or to instruct the eNBs to perform positioning measurements for a target UE (e.g., in the E-CELL-ID). The messages communicated between the E-SMLC 1740 and the eNB 1720 may be carried using the Location Positioning Protocol annex (LPPa) which may be communicated via the MME 1730. The messages may be terminated at the eNB 1720 and the E-SMLC 1740. Thus, although the messages are routed through the MME 1730, they are transparent to the MME 1730.

Once the assistance data is gathered, the E-SMLC 1740 may initiate UE procedures 1760 which may include requesting measurements from the UE 1710 and the delivery of assistance data to UE 1710 if required. The UE 1710 takes measurements and sends the measurements in a response message to the E-SMLC 1740. The measurement request, response and assistance delivery messages may be communicated using the Location Positioning Protocol (LPP) between the E-SMLC 1740 and the UE 1710. Although the messages are routed through the eNB 1720 and MME 1730, the messages are transparent to these nodes 1720, 1730.

Once the E-SMLC 1740 obtains the measurements, it may calculate the location estimate (assuming network-based/ UE-assisted solution) and may send a location response with the location estimate to the MME 1730. The MME 1730 may forward the location estimate to the requesting eNB 1720.

Figure 8:
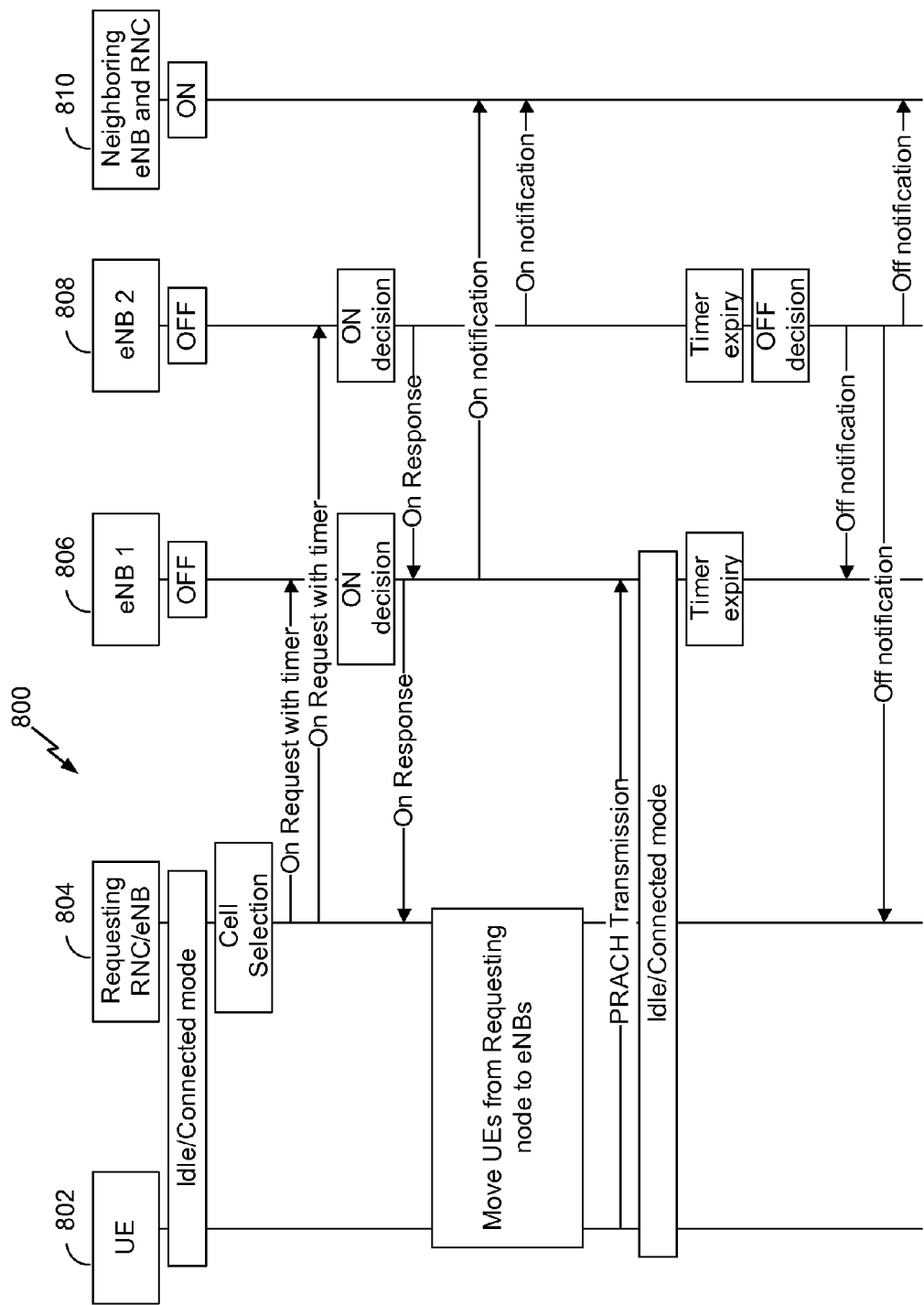
FIG. 8 is a call flow diagram for an embodiment of a wireless network having a timer-based enhancement for deactivating selected network entities that are not useful in offloading

Timer-Based Enhancement: In order to assist the selected eNBs (e.g., in the signaling-exchange solution described above) in deciding if and when to re-enter the sleep mode, the requesting RNC/eNB may attach a timer to the "ON-request" messages used to wake-up a set of eNBs. This timer may be used by the selected eNBs to confirm if they are indeed assisting the requesting node. If not, the eNBs may return to sleep. An example illustrating this technique is shown in FIG. 8. With reference to FIG. 8, a wireless communication system 800 includes UE(s) 802 that are in operative communication with a requesting node/entity 804 (e.g., an RNC or an eNB), which may be operative communication with numerous network entities. For example, the requesting entity 804 may be in operative communication with a network entity 806 (e.g., eNB-1), a network entity 808 (e.g., eNB-2), and/or a neighboring network entity 810 (e.g., an eNB or RNC). Only one UE 802 is illustrated; however, the system 800 may include a plurality of UEs 802. The UE 802 may be served by the requesting entity 804 and may be idle or connected mode. The eNB-1 806 and the eNB-2 808 may be in an OFF or sleep state/mode. The neighboring network entity 810 may be in an ON or awake state/mode.

With continued reference to the shown example in FIG. 8, the eNB-1 806 and the eNB-2 808 may receive "ON-request" messages with timer values, after which these eNBs may decide to turn ON their cells so "ON-response" and "ON-notification" messages may be sent to the requesting node 804 and the neighboring cell(s) 810, respectively. The UEs 802 (either in idle or connected mode on the requesting node) may be instructed to move from the requesting node 804 to the selected eNB cells (e.g., the network entity 806 and/or 808). Some of the UEs 802 may attempt to access the eNBs 806 and/or 808 by sending uplink messages (e.g., the UE 802 may try to access eNB-1 806 by sending a Physical Random Access Channel (PRACH) transmission message or the like). Other eNBs (e.g., eNB-2 808) may receive few or no messages from the UEs 802. Upon the expiration of the timers at the eNB-1 806 and the eNB-2 808, the eNB-2 808 may confirm that no UE accessed its cell(s); hence, the eNB-2 808 may make a decision to power OFF and inform neighboring cells using "OFF notification" messages. It is noted that the OFF decision may be made using load thresholds already configured in the eNBs or load thresholds included in the "ON-request" message.

Thus, with the timer-based enhancement/technique, the requesting node 804 can include a timer in the "ON-request" message sent to the eNBs 806 and 808. Upon the expiration of the timer, each eNB may verify if the condition required for staying ON has been met. If not, the eNBs may return to OFF/sleep mode.

In accordance with aspects of the embodiments described herein, the timer-based enhancement may be combined with the location-based enhancement. For example, in one embodiment, if the accuracy/confidence level of the UE location measurements obtained by the requesting node is below a required accuracy threshold (due to the UE location measurement capability not supporting adequate location algorithms or the UE taking location measurement in a challenging wireless propagation environment), the requesting node could choose to wake-up more eNB hotspots cells than is required to compensate for the UE location accuracy. During the wake-up process, a timer value could be included in the "ON request" message sent to the selected eNB hotspots cells and if it is determined that one or more of these eNBs that have been powered ON are not useful, then the timer-based technique may be implemented to turn OFF any eNBs that are not useful. Likewise, in another embodiment, after application of the timer-based technique, if it is determined that one or more of the eNBs that have been powered ON are not useful, then the location-based technique may be implemented to turn OFF any eNBs that are not useful. For example, this can implemented by the eNB cells which are about to be deactivated due to their inability to meet the required conditions at timer expiry notifying the requesting node. The requesting node can then use the location based enhancement to decide if those cells should stay in the "ON" mode or enter the "Sleep" mode.

Further with regard to the reliability or accuracy/confidence level of the UE location measurements, the positioning method may rely on the location information of active UEs in the coverage cells and on cell coverage information of the powered-off hotspot nodes that can be retrieved with network-centric approaches. The positioning method is expected to provide significant eNB energy savings with fairly accurate estimates of the eNB cell coverage information and active UE location. In most cell wake-up applications scenarios, it is expected that the accuracies of the UE location from techniques and the cell coverage information configured by OAM will be sufficient enough to harness eNB energy savings. In related aspects, UE location estimates with significant errors may be identified by using a standard-defined UE location accuracy parameter sent along with the UE location estimate. When the desired UE location accuracy is not achieved, a request for more location measurements can be triggered to improve the accuracy or change to/combine with other standard-defined UE positioning methods with better accuracy, such as, for example, AGNSS, OTDOA, etc. After that, if the desired location accuracy is still not met, then more hotspot eNBs than required may be selected around the target area to assist the coverage cells. Out of these cells, the ones that are later found not to be useful may be deactivated with the timer-based trigger. It is noted that multiple UE locations may be aggregated and used in estimating the user traffic distribution on the coverage cells, hence, increasing the statistical confidence. In further related aspects, the OAM may configure the eNB cell coverage information using readily available information such as the eNB location, transmit power, cell radius, and possible simple coverage prediction information. In particular cases where more detailed information is required, the accuracy can be increased with additional cell coverage information based on prediction maps and/or collected measured data.

In related aspects, a timer-based deactivation approach may also be applied to the Inter-RAT and Inter-eNB cell wake-up solutions described above, such as, for example, techniques involving the use of OAM low-load periods policy, IoT measurement(s), UEs measurement(s), and positioning information. The sources of errors for most of these cell wake-up solutions may lead to the selection of eNBs that are not helpful in offloading. In most of these cases, such eNBs should be powered off again in order to save energy on the eNB cells. The deactivation may be performed in a simple way using the timer-based approach currently proposed as an enhancement to location-based. This timer-based enhancement allow for cells to be deactivated again by attaching a timer-value to the ON/activation request message sent by the cells providing coverage to the eNBs that have been selected for power ON. In case the timer expires and the specified conditions to stay-on (e.g., being serving a certain amount of traffic) are not satisfied, the particular cells may turn-OFF again. For example, in case redundant eNBs are activated by any of the energy saving cell wake-up solutions described herein, a timer-based approach can provide a simple and effective way to deactivate them again.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 10:
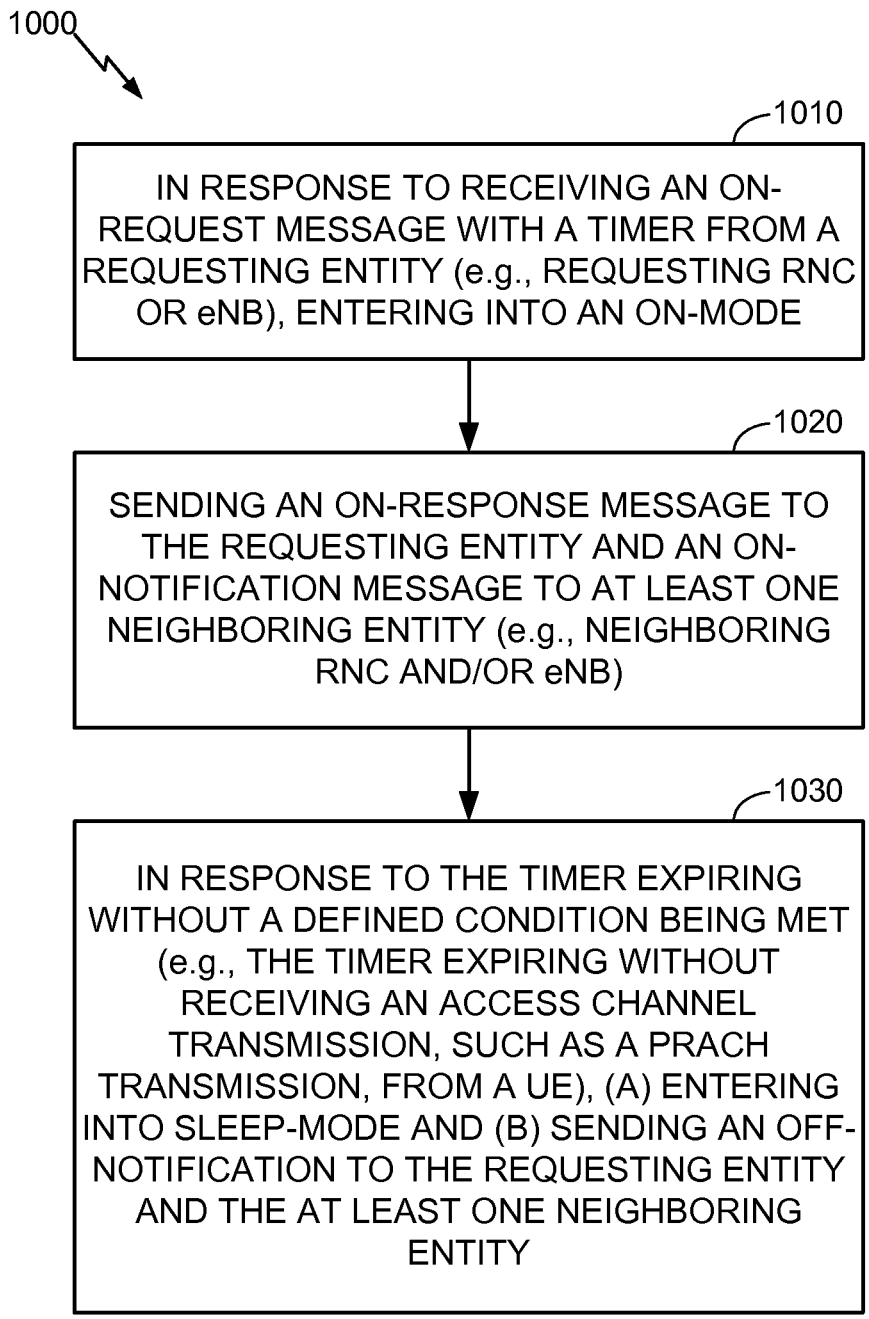
FIG. 10 illustrates an example timer-based methodology for selectively turning ON sleeping network entities to facilitate reducing the load on a given serving network entity.

In accordance with one or more aspects of the subject of this disclosure, there is provided a method for selectively turning ON sleeping network entities (e.g. eNBs). With reference to FIG. 10, illustrated is a timer-based methodology 1000 that may be performed at a wireless communication apparatus, such as a network entity (e.g., eNB). The method 1000 may involve, at 1010, in response to receiving an ON-request message with a timer from a requesting entity (e.g., requesting RNC or eNB), entering into an ON-mode. The method 1000 may involve, at 1020, sending an ON-response message to the requesting entity and an ON-notification message to at least one neighboring entity (e.g., neighboring RNC and/or eNB). The method 1000 may involve, at 1030, in response to the timer expiring without a defined condition being met (e.g., the timer expiring without receiving an access channel transmission, such as a PRACH transmission, from a UE), (a) entering into sleep-mode and (b) sending an OFF-notification to the requesting entity and the at least one neighboring entity.

Figure 11:
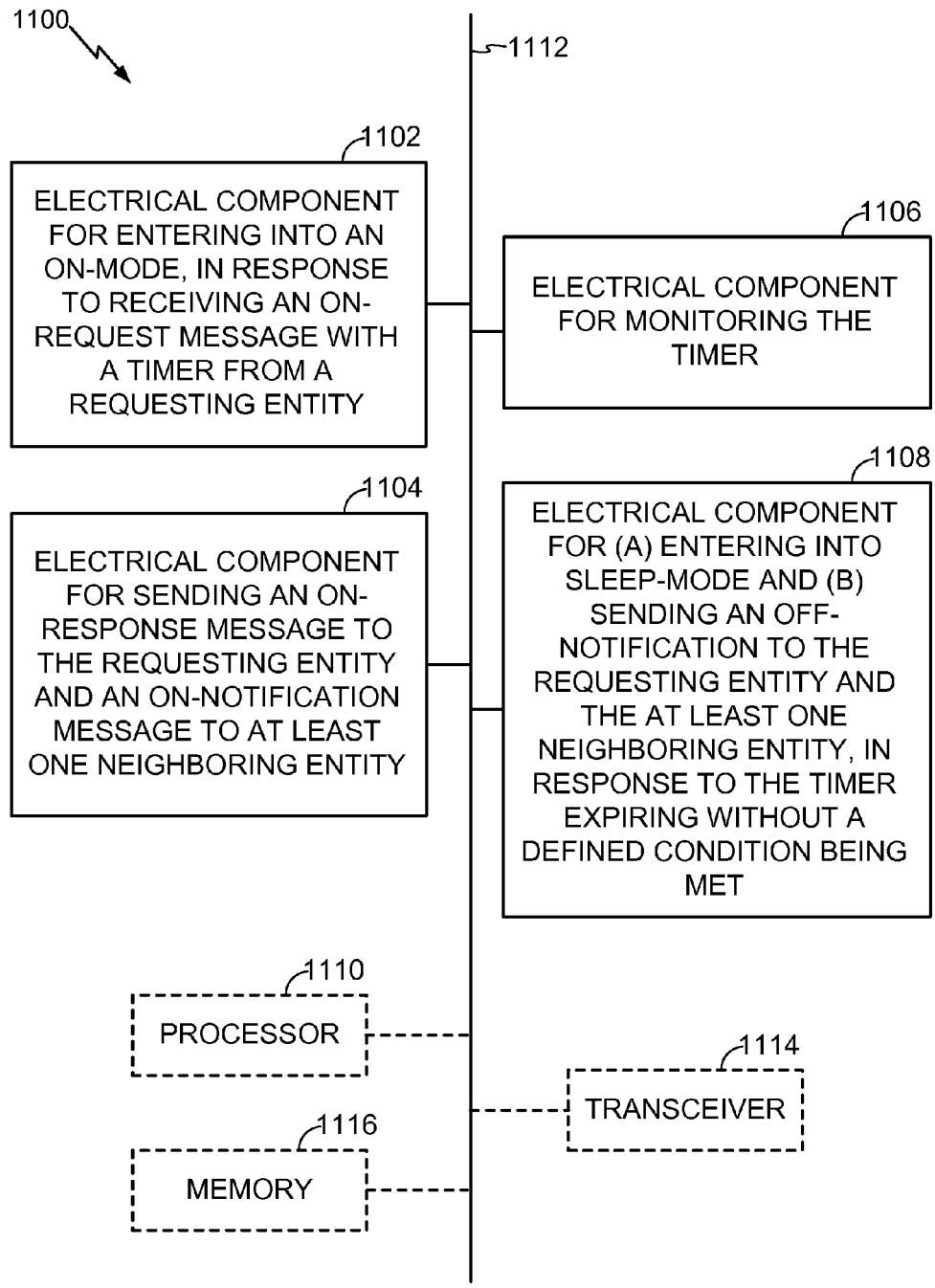
FIG. 11 illustrates an exemplary apparatus for turning ON network entities via a timer-based enhancement.

In accordance with one or more aspects of the embodiments described herein, there are provided devices and apparatuses for selectively executing the turning ON of sleeping network entities, as described above with reference to FIG. 10. With reference to FIG. 11, there is provided an exemplary apparatus 1100 that may be configured as a network entity in a wireless network, or as a processor or similar device for use within the network entity. The apparatus 1100 may include functional blocks that can represent functions implemented by a processor, software, or combination thereof (e.g., firmware). As illustrated, in one embodiment, the apparatus 1100 may comprise an electrical component or module 1102 for entering into an ON-mode, in response to receiving an ON-request message with a timer from a requesting entity. The apparatus 1100 may comprise an electrical component 1104 for sending an ON-response message to the requesting entity and an ON-notification message to at least one neighboring entity. The apparatus 1100 may comprise an electrical component 1106 for monitoring the timer. The apparatus 1100 may comprise an electrical component 1108 for (a) entering into an OFF-mode and (b) sending an OFF-notification to the requesting entity and the at least one neighboring entity, in response to the timer expiring without a defined condition being met.

In related aspects, the apparatus 1100 may optionally include a processor component 1110 having at least one processor, in the case of the apparatus 1100 configured as a network entity, rather than as a processor. The processor 1110, in such case, may be in operative communication with the components 1102-1108 via a bus 1112 or similar communication coupling. The processor 1110 may effect initiation and scheduling of the processes or functions performed by electrical components 1102-1108.

In further related aspects, the apparatus 1100 may include a radio transceiver component 1114. A stand alone receiver and/or stand alone transmitter may be used in lieu of or in conjunction with the transceiver 1114. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for effecting the processes and behavior of the components 1102-1108, and subcomponents thereof, or the processor 1110, or the methods disclosed herein. The memory component 1116 may retain instructions for executing functions associated with the components 1102-1108. While shown as being external to the memory 1116, it is to be understood that the components 1102-1108 can exist within the memory 1116.

Figure 12A:
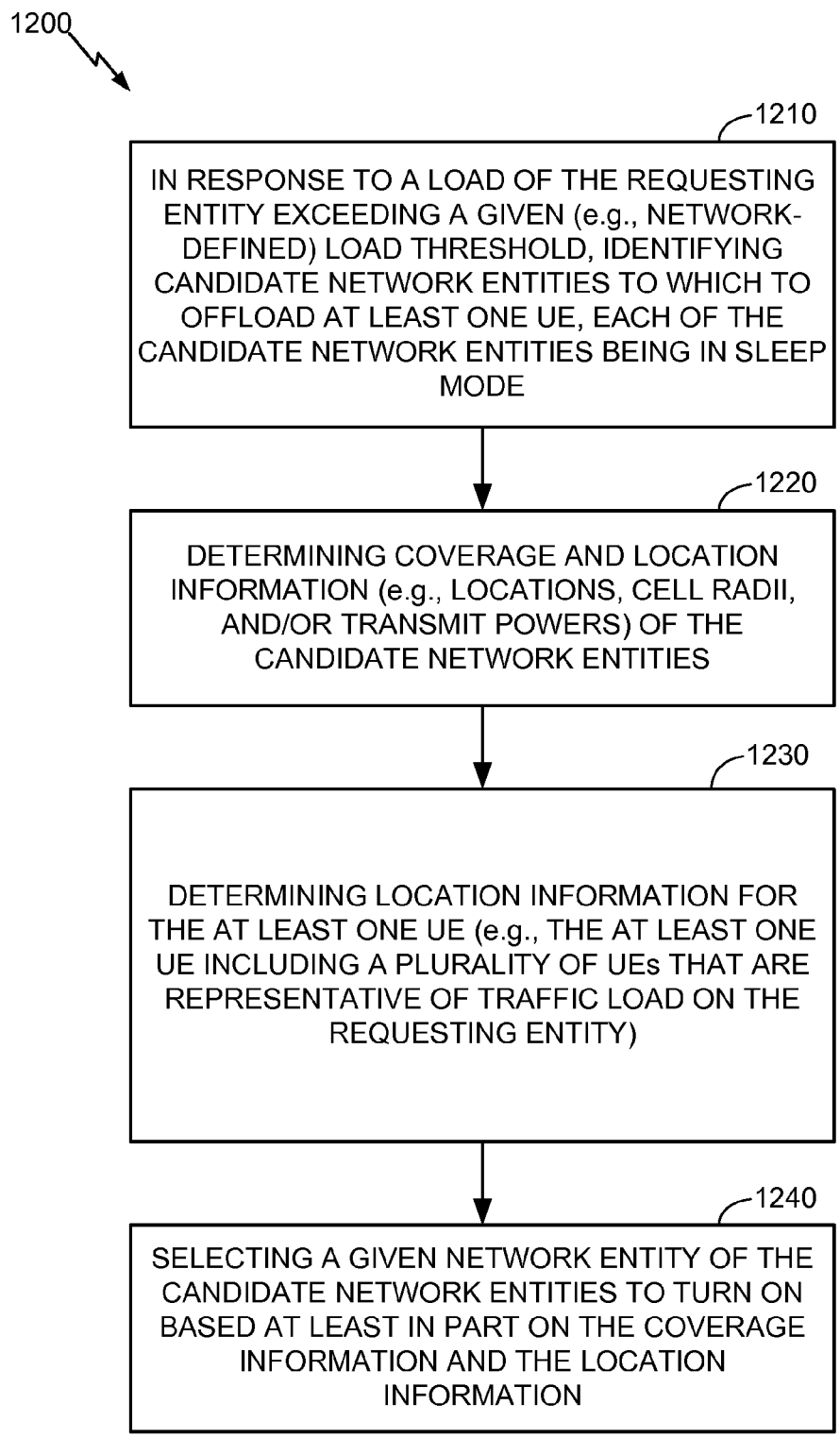
FIGS. 12A-B illustrate an example location-based methodology operable by a requesting/serving network entity for selectively turning ON sleeping network entities via a location-based enhancement to reduce the load on the requesting/serving network entity.

In accordance with one or more aspects of the embodiments described herein, there is provided a location-based methodology operable by a requesting entity (e.g., requesting RNC or eNB) in a wireless network to selectively turn ON sleeping network entities. With reference to FIG. 12A, there is shown a method 1200 that may involve, at 1210, in response to a load of the requesting entity exceeding a given (e.g., network-defined) load threshold, identifying candidate network entities to which to offload at least one UE, each of the candidate network entities being in sleep mode. The method 1200 that may involve, at 1220, determining coverage and location information (e.g., locations, cell radii, and/or transmit powers) of the candidate network entities. The method may involve, at 1230, determining location information for the at least one UE (e.g., the at least one UE including a plurality of UEs that are representative of the traffic load on the requesting entity). The method may involve, at 1240, selecting a given network entity of the candidate network entities to turn ON based at least in part on the coverage information and the location information.

Figure 12B:
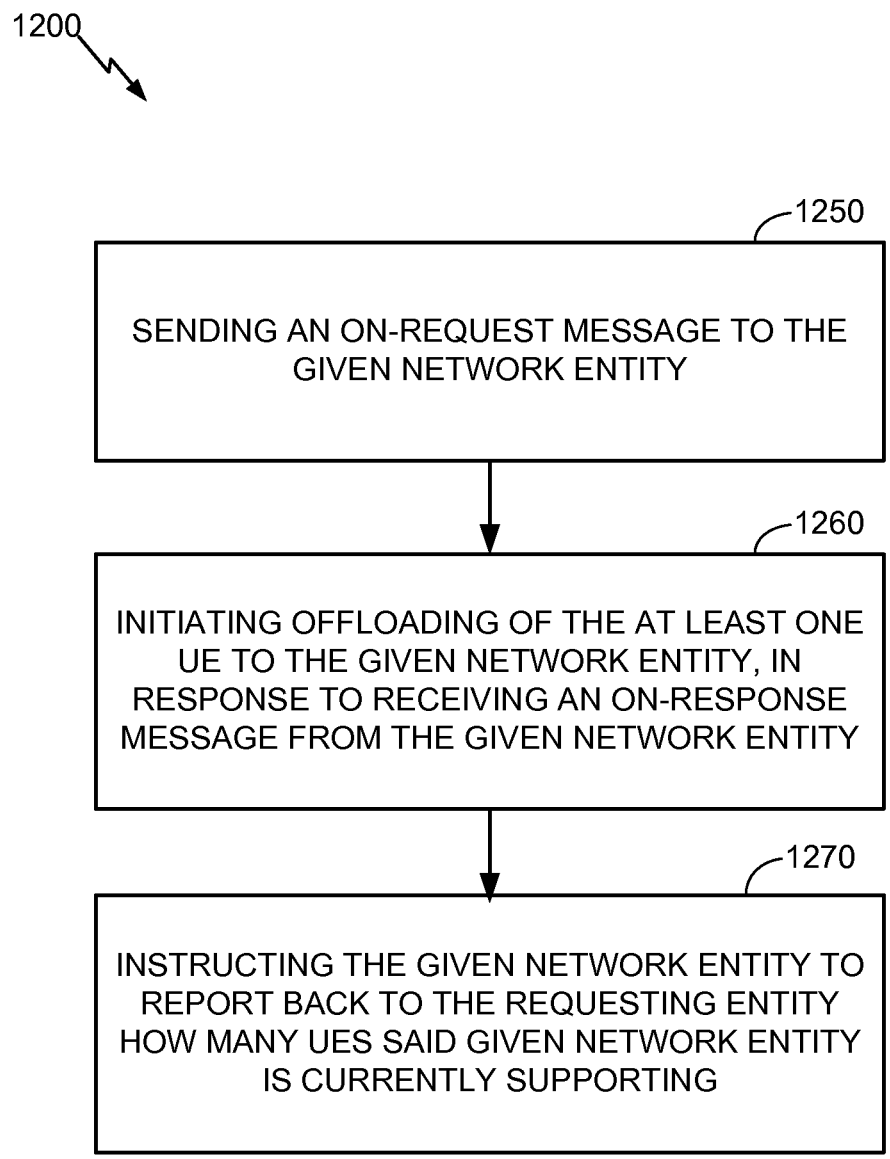

In related aspects, with reference to FIG. 12B, the method 1200 may further involve sending an ON-request message to the given network entity (block 1250), and initiating offloading of the at least one UE to the given network entity, in response to receiving an ON-response message from the given network entity (block 1260). The method 1200 may further involve instructing the given network entity to report back to the requesting entity how many UEs said given network entity is currently supporting (block 1270).

Figure 13:
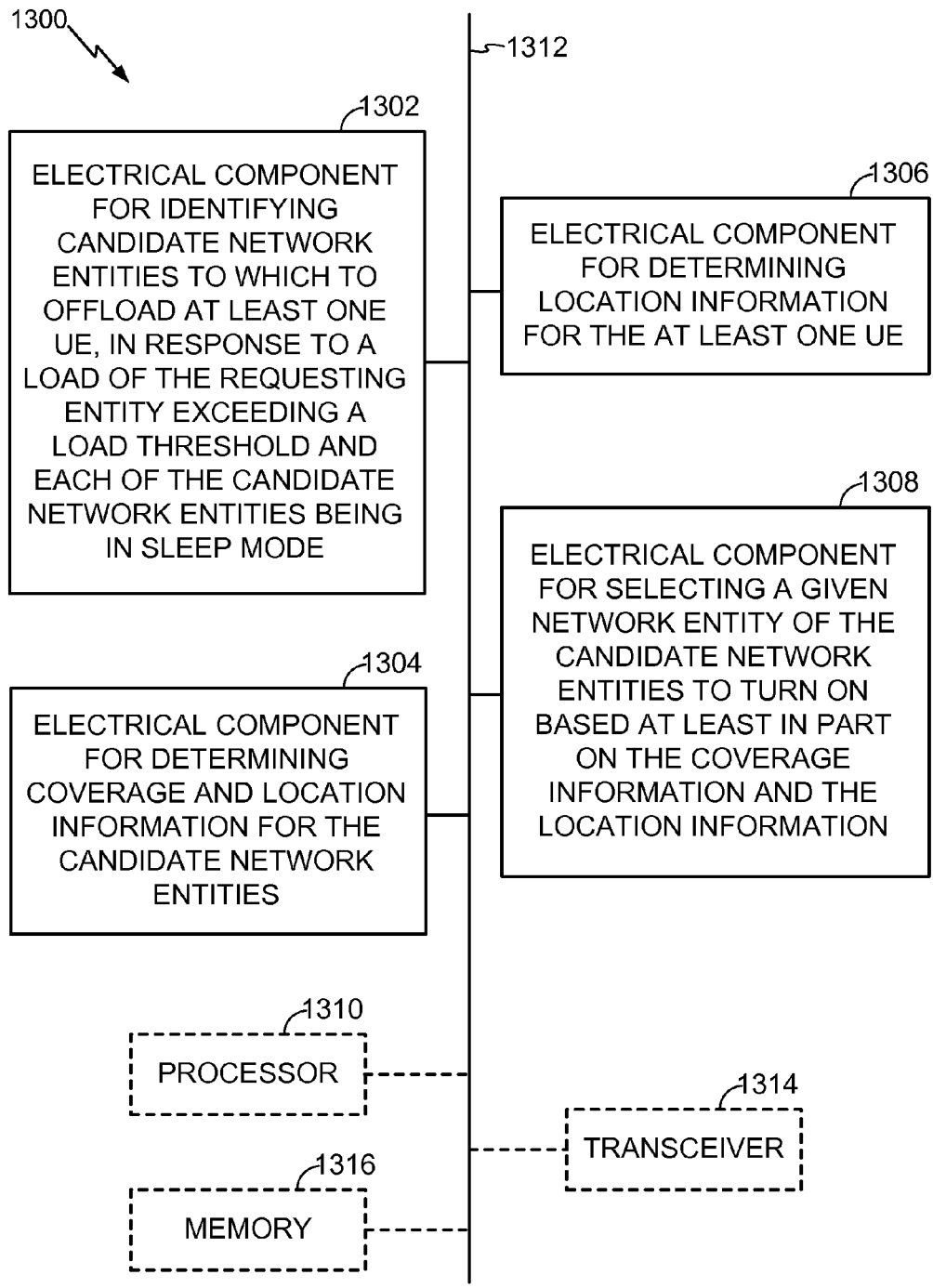
FIG. 13 illustrates an exemplary apparatus for turning ON network entities via a location-based enhancement.

In accordance with one or more aspects of the embodiments described herein, there are provided devices and apparatuses for selectively turning ON sleeping network entities, as described above with reference to FIGS. 12A-B. With reference to FIG. 13, there is provided an exemplary apparatus 1300 that may be configured as a requesting entity, or as a processor or similar device for use within the requesting entity. The apparatus 1300 may include functional blocks that can represent functions implemented by a processor, software, or combination thereof. As depicted, in one embodiment, the apparatus 1300 may comprise an electrical component or module 1302 for identifying candidate network entities to which to offload at least one UE, in response to a load of the requesting entity exceeding a load threshold and each of the candidate network entities being in sleep mode. The apparatus 1300 may comprise an electrical component 1304 for determining coverage and location information for the candidate network entities. The apparatus 1300 may comprise an electrical component 1306 for determining location information for the at least one UE. The apparatus 1300 may comprise an electrical component 1308 for selecting a given network entity of the candidate network entities to turn ON based at least in part on the coverage information and the location information. For the sake of conciseness, the rest of the details regarding apparatus 1300 are not further elaborated on; however, it is to be understood that the remaining features and aspects of the apparatus 1300 are substantially similar to those described above with respect to apparatus 1100 of FIG. 11.

Figure 14A:
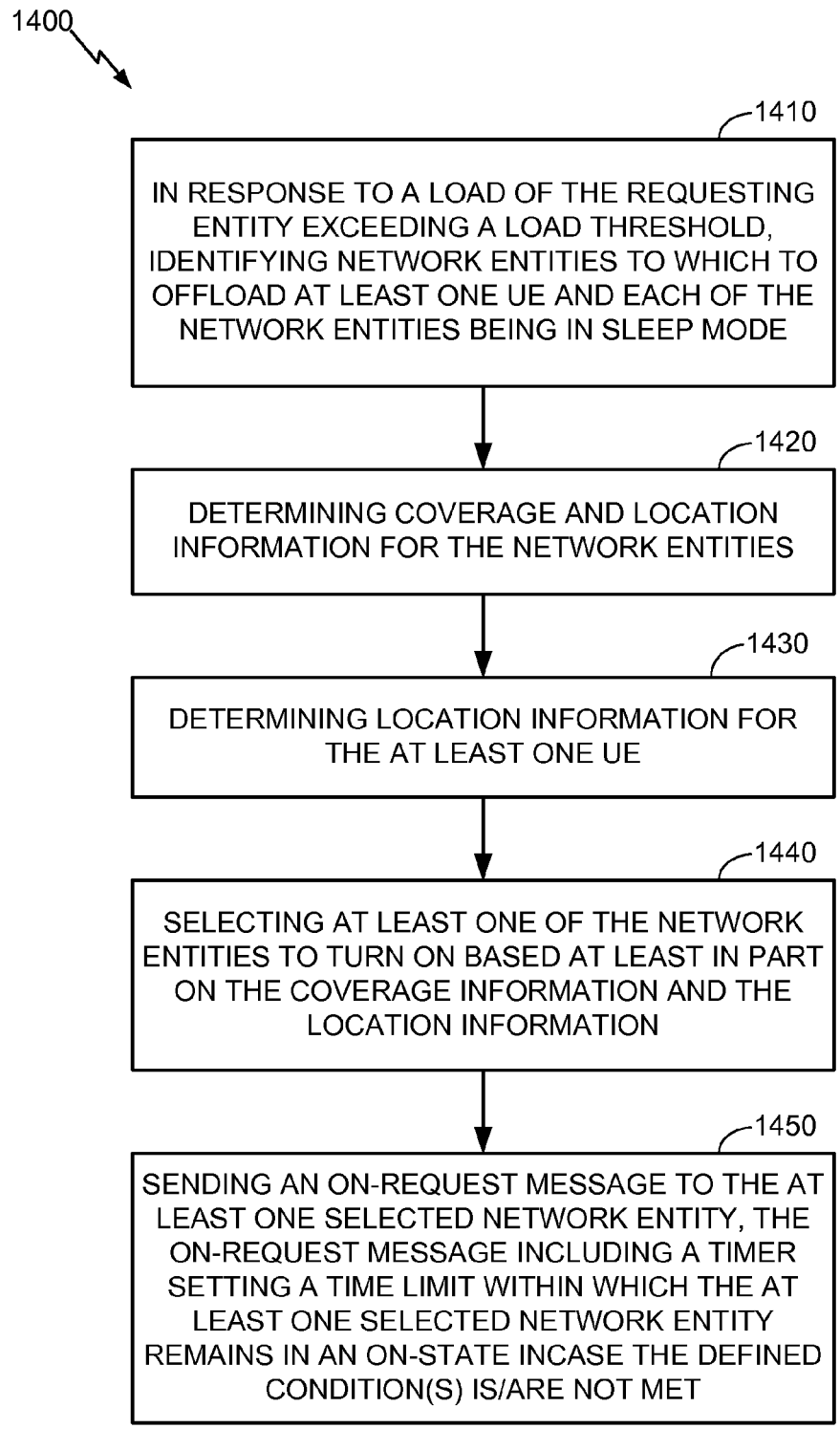
FIGS. 14A-B illustrates an example methodology operable by a requesting/serving network entity involving a combination of timer-based and location-based enhancements.

In accordance with one or more aspects of the embodiments described herein, there is provided a combination methodology operable by a requesting entity in a wireless network to selectively turn ON sleeping network entities when the requesting entity experiences a high load level. With reference to FIG. 14A, there is shown a method 1400 that may involve, at 1410, in response to a load of the requesting entity exceeding a load threshold, identifying network entities to which to offload at least one UE and each of the network entities being in sleep mode. The method 1400 may involve, at 1420, determining coverage and location information for the network entities. The method 1400 may involve, at 1430, determining location information for the at least one UE. The method 1400 may involve, at 1440, selecting at least one of the network entities to turn ON based at least in part on the coverage information and the location information. The method 1400 may involve, at 1450, sending an ON-request message to the at least one selected network entity, the ON-request message including a timer setting a time limit within which the at least one selected network entity remains in an ON-state in the case the defined condition(s) is/are not met.

Figure 14B:
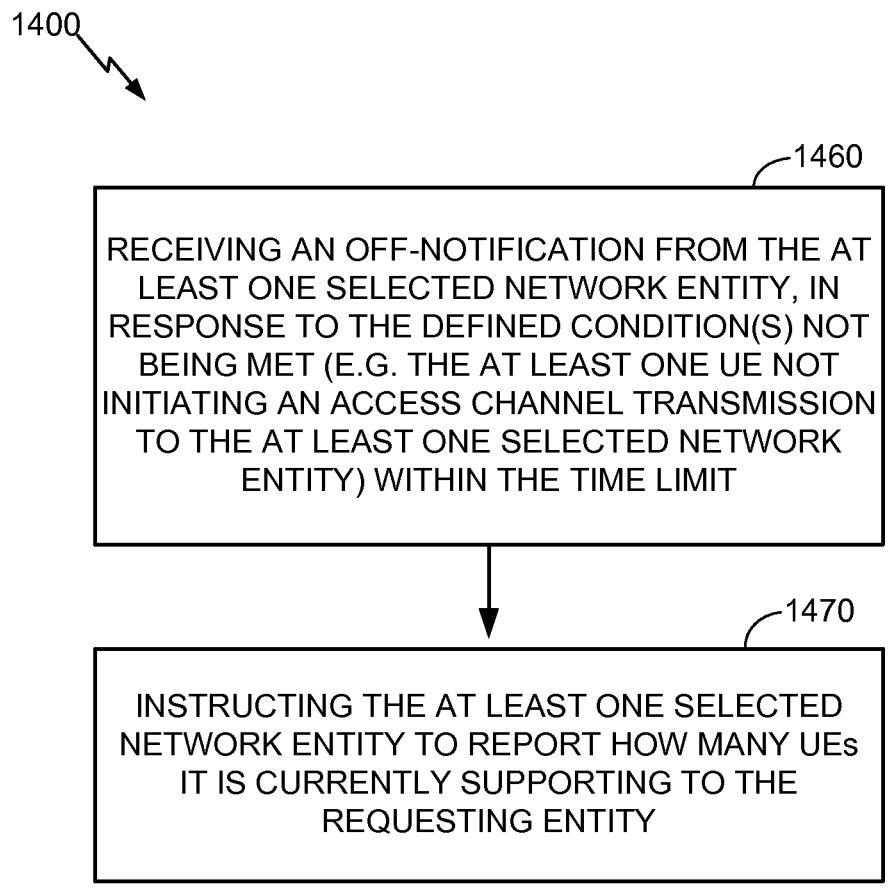

In related aspects, with reference to FIG. 14B, the method 1400 may further involve receiving an OFF-notification from the at least one selected network entity, in response to the defined condition(s) not being met (e.g., the at least one UE not initiating an access channel transmission to the at least one selected network entity) within the time limit (block 1460). The method 1400 may further involve instructing the at least one selected network entity to report how many UEs it is currently supporting to the requesting entity (block 1470).

Figure 15:
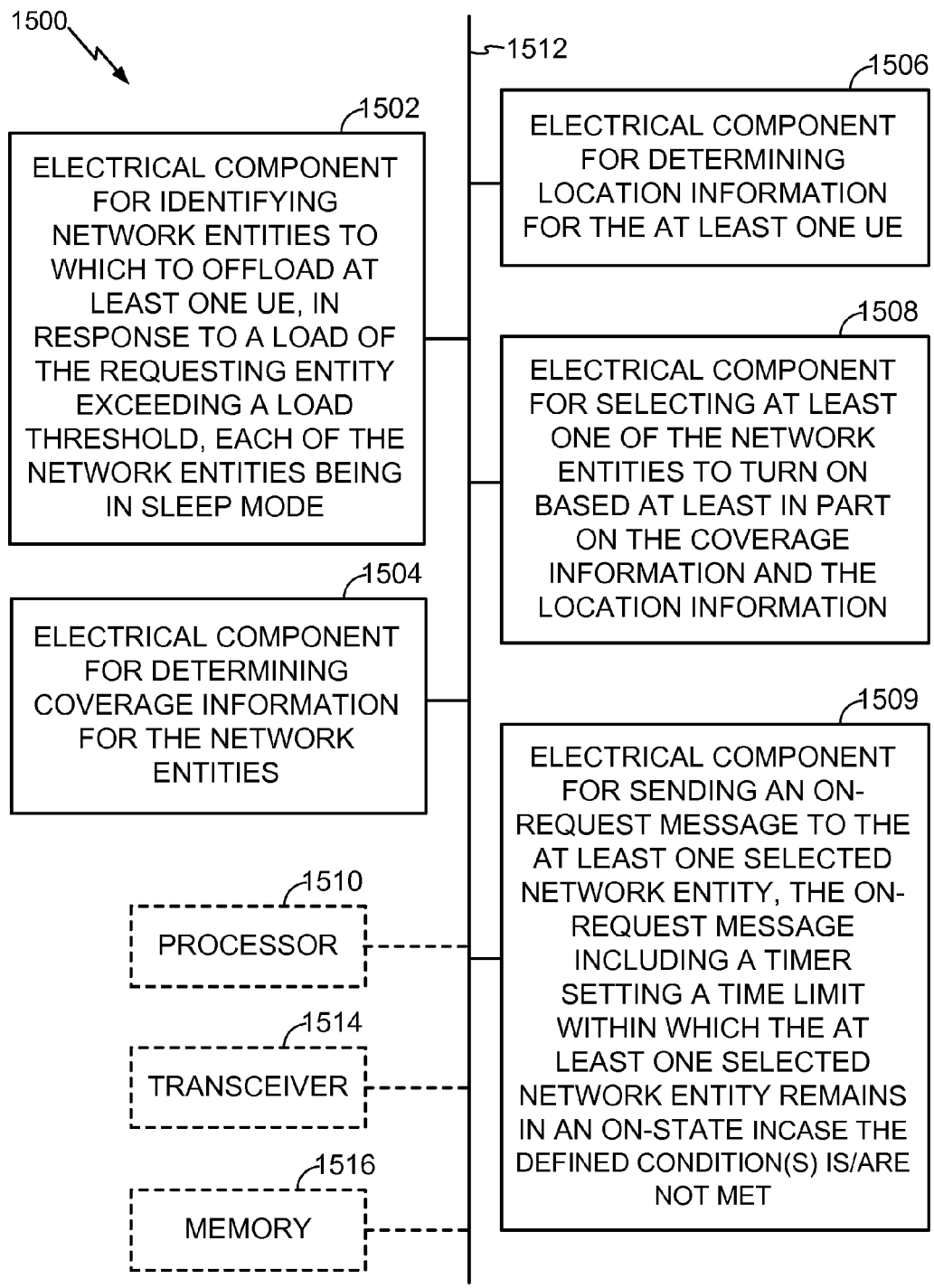
FIG. 15 illustrates an exemplary apparatus for turning ON network entities via a combination of timer-based and location-based enhancements.

In accordance with one or more aspects of the embodiments described herein, there are provided devices and apparatuses for selectively turning ON sleeping network entities, as described above with reference to FIGS. 14A-B. With reference to FIG. 15, there is provided an exemplary apparatus 1500 that may be configured as a requesting entity, or as a processor or similar device for use within the requesting entity. The apparatus 1500 may include functional blocks that can represent functions implemented by a processor, software, or combination thereof. As depicted, in one embodiment, the apparatus 1500 may comprise an electrical component or module 1502 for identifying network entities to which to offload at least one user equipment (UE), in response to a load of the requesting entity exceeding a load threshold and each of the network entities being in sleep mode. The apparatus 1500 may include an electrical component 1504 for determining coverage and location information for the network entities, as well as an electrical component 1506 for determining location information for the at least one UE. The apparatus 1500 may include an electrical component 1508 for selecting at least one of the network entities to turn ON based at least in part on the coverage information and the location information. The apparatus 1500 may include an electrical component 1509 for sending an ON-request message to the at least one selected network entity, the ON-request message including a timer setting a time limit within which the at least one selected network entity remains in an ON-state in the case that the defined condition(s) is/are not met. For the sake of conciseness, the rest of the details regarding apparatus 1500 are not further elaborated on; however, it is to be understood that the remaining features and aspects of the apparatus 1500 are substantially similar to those described above with respect to apparatus 1100 of FIG. 11.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method operable by a requesting entity in a wireless communication network, comprising:
   in response to a load of the requesting entity exceeding a load threshold, identifying candidate network entities to which to offload at least one user equipment (UE), each of the candidate network entities being in sleep mode;
   determining coverage and location information for the candidate network entities;
   determining location information for the at least one UE; and
   selecting a given network entity of the candidate network entities to turn ON based at least in part on the coverage information and the location information.

2. The method of claim 1, wherein the coverage and location information comprises at least one of locations, cell radii, and transmit powers of the candidate network entities.

3. The method of claim 1, further comprising:
   sending an ON-request message to the given network entity; and
   initiating offloading of the at least one UE to the given network entity in response to receiving an ON-response message from the given network entity.

4. The method of claim 1, further comprising instructing the given network entity to report back to the requesting entity how many UEs said given network entity is currently supporting.

5. The method of claim 1, wherein the at least one UE comprises a plurality of UEs that are representative of traffic load on the requesting entity.

6. The method of claim 5, wherein each of the plurality of UEs provides a corresponding location information that meets a network-defined location accuracy threshold.

7. An apparatus for wireless communication, comprising:
   means for identifying candidate network entities to which to offload at least one user equipment (UE), in response to a load of the requesting entity exceeding a load threshold, each of the candidate network entities being in sleep mode;
   means for determining coverage and location information for the candidate network entities;
   means for determining location information for the at least one UE; and
   means for selecting a given network entity of the candidate network entities to turn ON based at least in part on the coverage information and the location information.

8. An apparatus for wireless communication, comprising:
   at least one processor configured to: identify candidate network entities to which to offload at least one user equipment (UE), in response to a load of the requesting entity exceeding a load threshold, each of the candidate network entities being in sleep mode; determine coverage and location information for the candidate network entities; determine location information for the at least one UE; and select a given network entity of the candidate network entities to turn ON based at least in part on the coverage information and the location information; and
   a memory coupled to the at least one processor for storing data.

9. A computer-readable storage medium, comprising:
   code which, when executed by at least one processor, causes the at least one processor to:
   identify candidate network entities to which to offload at least one user equipment (UE), in response to a load of the requesting entity exceeding a load threshold, each of the candidate network entities being in sleep mode;
   determine coverage and location information for the candidate network entities;
   determine location information for the at least one UE; and
   select a given network entity of the candidate network entities to turn ON based at least in part on the coverage information and the location information.

* * * * *